(12) United States Patent
He et al.

(10) Patent No.: US 9,495,125 B2
(45) Date of Patent: Nov. 15, 2016

(54) ELECTRONIC DEVICE AND DISPLAY METHOD

(71) Applicants: Beijing Lenovo Software, Ltd., Haidian District, Beijing (CN); Lenovo (Beijing) Co., Ltd., Haidian District, Beijing (CN)

(72) Inventors: Zhiqiang He, Beijing (CN); Junfeng Liu, Beijing (CN); Hongguang Wang, Beijing (CN); Qianying Wang, Beijing (CN); Chunyu Song, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 35 days.

(21) Appl. No.: 14/230,105

(22) Filed: Mar. 31, 2014

(65) Prior Publication Data

US 2015/0049000 A1 Feb. 19, 2015

(30) Foreign Application Priority Data

Aug. 13, 2013 (CN) .......................... 2013 1 0351409
Dec. 23, 2013 (CN) .......................... 2013 1 0717724

(51) Int. Cl.
*G09G 5/00* (2006.01)
*G06F 3/14* (2006.01)
(Continued)

(52) U.S. Cl.
CPC ......... *G06F 3/1423* (2013.01); *G02B 27/0101* (2013.01); *G02B 27/017* (2013.01); *G02B 27/0176* (2013.01); *G02B 2027/014* (2013.01);
(Continued)

(58) Field of Classification Search
None
See application file for complete search history.

(56) References Cited

U.S. PATENT DOCUMENTS 6,158,884 A * 12/2000 Lebby et al. ................ 368/282
6,619,835 B2    9/2003 Kita
(Continued)

FOREIGN PATENT DOCUMENTS

CN    1324030    11/2001
CN    2466691    12/2001
(Continued)

OTHER PUBLICATIONS

First Office Action dated May 23, 2016 out of Chinese priority Application No. 201310421847.2 (21 pages including English translation).
(Continued)

*Primary Examiner* — Joseph Feild
*Assistant Examiner* — Emily Frank
(74) *Attorney, Agent, or Firm* — Brinks Gilson & Lione; G. Peter Nichols

(57) ABSTRACT

An electronic device and a display method includes a main body apparatus with a processing unit which generates a first image and performs display control; a first fixing apparatus connected with the main body apparatus, which maintains a relative location relationship between the electronic device and at least a part of body of a user when the user wears the electronic device; and a first display unit arranged on the main body apparatus and/or the first fixing apparatus, which outputs the first image; wherein the first display unit comprises a first display component which displays the first image, and a first optical component which receives light corresponding to the first image emitted from the first display component, and changes the light path of the light corresponding to the first image to form a magnified virtual image corresponding to the first image.

18 Claims, 25 Drawing Sheets

(51) Int. Cl.
*G02B 27/01* (2006.01)
*G09G 3/20* (2006.01)

(52) U.S. Cl.
CPC ......... *G02B 2027/0138* (2013.01); *G09G 3/20* (2013.01); *G09G 2300/023* (2013.01); *G09G 2300/026* (2013.01)

(56) References Cited

U.S. PATENT DOCUMENTS

| | | | |
|---|---|---|---|
| 7,699,473 | B2 | 4/2010 | Mukawa |
| 8,279,716 | B1 | 10/2012 | Gossweiler |
| 8,379,488 | B1 | 2/2013 | Gossweiler |
| RE45,148 | E | 9/2014 | Mukawa |
| 8,902,714 | B2 | 12/2014 | Gossweiler |
| 2001/0043514 | A1 | 11/2001 | Kita |
| 2002/0135615 | A1* | 9/2002 | Lang ............... 345/764 |
| 2003/0210467 | A1 | 11/2003 | Song |
| 2006/0146013 | A1 | 7/2006 | Arneson |
| 2007/0064310 | A1 | 3/2007 | Mukawa |
| 2008/0151379 | A1* | 6/2008 | Amitai ............... 359/630 |
| 2011/0141114 | A1 | 6/2011 | Chen |
| 2011/0205851 | A1 | 8/2011 | Harris |
| 2012/0274508 | A1* | 11/2012 | Brown et al. ......... 342/357.25 |
| 2013/0163390 | A1 | 6/2013 | Gossweiler |
| 2013/0342672 | A1 | 12/2013 | Gray |
| 2014/0107493 | A1* | 4/2014 | Yuen et al. .......... 600/473 |
| 2014/0146248 | A1 | 5/2014 | Wang |
| 2015/0049066 | A1* | 2/2015 | He et al. ............. 345/204 |
| 2015/0049120 | A1* | 2/2015 | He et al. ............. 345/660 |

FOREIGN PATENT DOCUMENTS

| | | |
|---|---|---|
| CN | 1771454 | 5/2006 |
| CN | 101091377 | 12/2007 |
| CN | 202486428 U | 10/2012 |
| CN | 102881229 | 1/2013 |
| CN | 202735594 U | 2/2013 |
| CN | 203101853 U | 7/2013 |
| CN | 103309040 | 9/2013 |
| CN | 203433196 U | 2/2014 |
| JP | 2001-311908 | 11/2001 |

OTHER PUBLICATIONS

First Office Action dated Apr. 6, 2016 out of related Chinese Application No. 20130351409.3 (10 pages including English translation).
Non-Final Rejection dated Mar. 9, 2016 out of U.S. Appl. No. 14/230,068 (36 pages).
Final Rejection dated Jun. 30, 2016 out of U.S. Appl. No. 14/230,068 (19 pages).
Non-Final Rejection dated Jul. 26, 2016 out of U.S. Appl. No. 14/230,629 (39 pages).
First Office Action dated Sep. 2, 2016 out of Chinese priority Patent Application No. 201310717724.3 (29 pages including English translation).

* cited by examiner

ELECTRONIC DEVICE AND DISPLAY METHOD

BACKGROUND

This application claims priority to Chinese patent application No. 201310351409.3 filed on Aug. 13, 2013; and Chinese patent application No. 201310717724.3 filed on Dec. 23, 2013, the entire contents of which are incorporated herein by reference.

The present disclosure relates to the field of electronic device, and more particularly to an electronic device with a built-in near-to-eye display system and a display method thereof.

Presently, the wearable electronic devices such as the smart watch is only provided with a conventional display such as a liquid crystal display (LCD), an organic electroluminesence display, an organic light emitting diode (OLED) display etc., in general. Limited by the size of the wearable electronic device such as the smart watch itself, the display area of the provided conventional display is generally very small, and only limited information can be displayed.

Therefore, it is desirable to provide an electronic device and a display method thereof, which is capable of not being limited by the size of the wearable electronic device such as the smart watch itself, and providing an image or video display with a larger size and a higher definition, thereby improving the related user experience. Moreover, it can provide multiple wearing manners adaptively according to the different usage scenes and user requirements, and provide a free combination and a switch between multiple functional modules, thereby improving the user experience of the electronic device.

SUMMARY

According to an embodiment of the present disclosure, an electronic device is provided, comprising: a main body apparatus comprising a processing unit which generates a first image and performs display control; a fixing apparatus connected with the main body apparatus, having at least a fixed state in which the fixing apparatus can be at least a part of an annular space or an approximate annular space meeting a first predetermined condition, the annular space or the approximate annular space being capable of surrounding an outer side of a cylinder meeting a second predetermined condition; and a first display unit arranged on the main body apparatus or the fixing apparatus, which outputs the first image, wherein the first display unit comprises a first display component which displays the first image, and a first optical component which receives light corresponding to the first image emitted from the first display component, and changes the light path of the light corresponding to the first image to form a magnified virtual image corresponding to the first image.

Also, in the electronic device according to the embodiment of the present disclosure, at least a part of the first optical component is a component the transmittance of which meets a predetermined condition in the outward direction of the annular space or the approximate annular space.

Also, in the electronic device according to the embodiment of the present disclosure, the transmittance of the electronic device meets a predetermined condition in the outward direction of the annular space or the approximate annular space corresponding to at least a part of the first optical component.

Also, the electronic device according to the embodiment of the present disclosure further comprises a second display unit the type of which is different from that of the first display unit, wherein one of the first display unit and the second display unit is arranged on the main body apparatus, the other of which is arranged on the fixing apparatus, and the display direction of the second display unit is the outward direction of the annular space or the approximate annular space.

Also, in the electronic device according to the embodiment of the present disclosure, the first display unit is arranged on the main body apparatus, and the second display unit is arranged on the fixing apparatus; or the second display unit is arranged on the main body apparatus and the first display unit is arranged on the fixing apparatus.

Also, the electronic device according to the embodiment of the present disclosure further comprises a sensor unit arranged on the main body apparatus or the fixing apparatus, which generates a first control signal when sensing that the first predetermined condition is met, the processing unit controlling the on/off of the first display unit according to the first control signal.

Also, in the electronic device according to the embodiment of the present disclosure, the sensor unit is an acceleration sensor, the acceleration component value in the gravity direction of the first control signal is larger than or equal to a predetermined value, and the processing unit controls the on/off of the first display unit according to the first control signal.

Also, the electronic device according to the embodiment of the present disclosure further comprises an image capturing unit arranged on the main body apparatus or the fixing apparatus, and an image capturing direction of the image capturing unit is opposite to an image output direction of the first display unit in the radial direction of the annular space or the approximate annular space.

Also, in the electronic device according to the embodiment of the present disclosure, the image capturing unit captures an interaction action of the user to generate a first image capturing signal, and the processing unit converts the first image capturing signal into a second control signal to control the display of the second image.

Also, in the electronic device according to the embodiment of the present disclosure, the image capturing unit captures a first sub image in the image capturing direction, and the processing unit generates a second sub image, and superimposes the first sub image with the second sub image to generate the first image.

Also, the electronic device according to the embodiment of the present disclosure further comprises a third display unit arranged on the main body apparatus or the fixing apparatus together with the first display unit, which outputs a third image, wherein the second display unit comprise a second display component for displaying the third image, and a second optical component for receiving light corresponding to the third image emitted from the second display component and changing the light path of the light corresponding to the third image to form a magnified virtual image corresponding to the third image.

According to another embodiment of the present disclosure, a display method applied to an electronic device is provided, the electronic device comprising: a main body apparatus comprising a processing unit which generates a first image and performs display control; a fixing apparatus connected with the main body apparatus, having at least a fixed state in which the fixing apparatus can be at least a part of an annular space or an approximate annular space meeting a first predetermined condition, the annular space or the approximate annular space being capable of surrounding an outer side of a cylinder meeting a second predetermined condition; and a first display unit arranged on the main body apparatus or the fixing apparatus, which outputs the first image, wherein the first display unit comprises a first display component which displays the first image, and a first optical component which receives light corresponding to the first image emitted from the first display component, and changes the light path of the light corresponding to the first image to form a magnified virtual image corresponding to the first image; the display method comprising: generating or acquiring an image signal for display; and performing display based on the image signal.

According to another embodiment of the present disclosure, an electronic device is provided, comprising: a main body apparatus comprising a processing unit which generates a first image and performs display control; a first fixing apparatus connected with the main body apparatus, which maintains a relative location relationship between the electronic device and at least a part of body of a user when the user wears the electronic device; a first display unit arranged on the main body apparatus and/or the first fixing apparatus, which outputs the first image, wherein the first display unit comprises a first display component which displays the first image, and a first optical component which receives light corresponding to the first image emitted from the first display component, and changes the light path of the light corresponding to the first image to form a magnified virtual image corresponding to the first image.

Also, in the electronic device according to the embodiment of the present disclosure, the first fixing apparatus has at least a first fixed state in which the first fixing apparatus can be at least a part of an annular space or an approximate annular space meeting a first predetermined condition, the annular space or the approximate annular space being capable of surrounding an outer side of a cylinder meeting a second predetermined condition.

Also, in the electronic device according to the embodiment of the present disclosure, the diameter of the annular space or the approximate annular space is variable, and the difference between the maximum and the minimum of the diameter is larger than a predetermined threshold.

Also, in the electronic device according to the embodiment of the present disclosure, the first fixing apparatus comprises at least a flexible unit having a relaxed first state in which the diameter of the annular space or the approximate annular space is the maximum, and a tight second state in which the diameter of the annular space or the approximate annular space is the minimum.

Also, in the electronic device according to the embodiment of the present disclosure, the first fixing apparatus further comprises an adjusting unit which controls the diameter of the annular space or the approximate annular space to change between the maximum and the minimum.

Also, in the electronic device according to the embodiment of the present disclosure, the main body apparatus comprises a first connecting unit, the first fixing apparatus comprises a second connecting unit, the main body apparatus and the first fixing apparatus are connected with each other through the coupling between the first connecting unit and the second connecting unit; the electronic device further comprises a second fixing apparatus having at least a second fixed state in which the second fixing apparatus is at least a part of an approximate rectangular space capable of surrounding an outer surface of an object meeting a third predetermined condition, the first fixing apparatus comprises a third connecting unit, the electronic device is switched from the first fixed state to the second fixed state when the first connecting unit and the second connecting unit are discoupled and the first connecting unit and the third connecting unit are coupled.

Also, in the electronic device according to the embodiment of the present disclosure, the main body apparatus comprises at least one first sub unit, the first fixing apparatus comprises at least one second sub unit, and the at least one first sub unit and the at least one second sub unit form a data or electrical connection.

Also, in the electronic device according to the embodiment of the present disclosure, the at least one second sub unit is connected to the first fixing apparatus through a dismountable connection interface.

Also, in the electronic device according to the embodiment of the present disclosure, one or more of the at least one first sub unit and one or more of the at least one second sub unit are sub units with the same type and different performance parameters.

Also, in the electronic device according to the embodiment of the present disclosure, the first sub unit comprised in the main body apparatus is capable of supporting work of the electronic device.

Also, in the electronic device according to the embodiment of the present disclosure, performance of the first sub unit is lower than that of the second sub unit with the same type.

Also, in the electronic device according to the embodiment of the present disclosure, battery capacity of the first sub unit as a battery unit is lower than that of the second sub unit as the battery unit.

Also, in the electronic device according to the embodiment of the present disclosure, communication distance and communication rate of the first sub unit as a communication unit is lower than those of the second sub unit as the communication unit.

According to another embodiment of the present disclosure, a display method applied to an electronic device is provide, the electronic device comprising: a main body apparatus comprising a processing unit which generates a first image and performs display control; a first fixing apparatus connected with the main body apparatus, which maintains a relative location relationship between the electronic device and at least a part of body of a user; and a first display unit arranged on the main body apparatus or the fixing apparatus, which outputs the first image, wherein the first display unit comprises a first display component which displays the first image, and a first optical component which receives light corresponding to the first image emitted from the first display component, and changes the light path of the light corresponding to the first image to form a magnified virtual image corresponding to the first image; the display method comprising: generating or acquiring an image signal for display; and performing display based on the image signal.

The electronic device and the display method according to the embodiments of the present disclosure are not limited by the size of the wearable electronic device such as the smart watch itself, and the image or video display with a larger size and a higher definition is provided. Also, the power consumption of the electronic device is relatively low compared to the micro projector for displaying a large image, the electronic device is not limited by the usage scene and well usage privacy is also provided.

Also, the electronic device and the display method according to the embodiments of the present disclosure can provide multiple wearing manners adaptively according to different usage scenes and user requirements, and provide a free combination and switching between multiple functional modules, thereby improving user experience of the electronic device.

It should be noted that the above general description and the following detailed description are exemplary and are intended to provide a further description of the technology to be protected.

DETAILED DESCRIPTION

Hereinafter the embodiments of the disclosure will be described with reference to the accompany drawings.

(First Implementation)

First, the electronic device according to an embodiment of the present disclosure will be described with reference to FIGS. 1A-1C. The electronic device according to the embodiment of the present disclosure may be a wearable electronic device such as a smart watch. Of course, it will be easily understood by those skilled in the art that the electronic device according to the embodiment of the present disclosure is not limited thereto, but may be any electronic device with a display unit therein. For the convenience of description, it will be described taking the wearable electronic device such as the smart watch as an example.

Figure 1A:
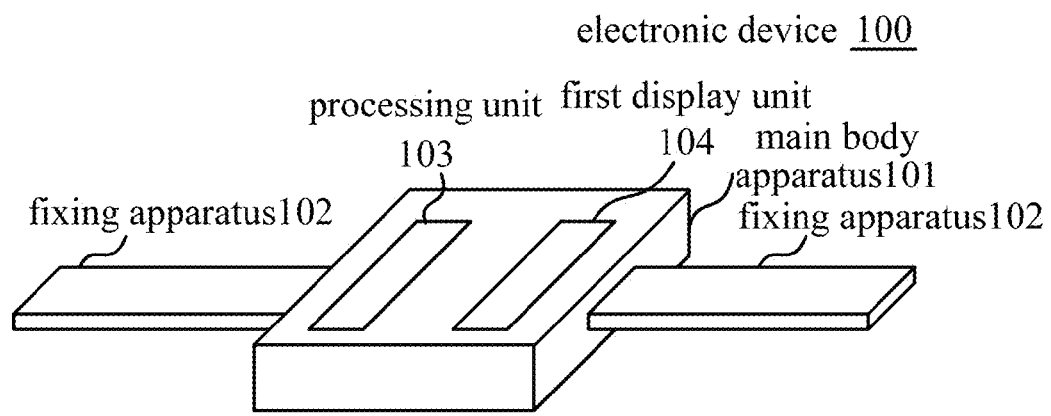
FIGS. 1A-1E are structural diagrams showing an electronic device according to a first embodiment of the present disclosure.

FIGS. 1A-1E are structural diagrams showing an electronic device according to a first embodiment of the present disclosure. As shown in FIG. 1A, the electronic device 100 according to the embodiment of the present disclosure includes a main body apparatus 101 and a fixing apparatus 102. The fixing apparatus 102 is connected with the main body apparatus 101. The fixing apparatus 102 has at least a fixed state in which the fixing apparatus 102 can be at least a part of an annular space or an approximate annular space meeting a first predetermined condition, the annular space or the approximate annular space being capable of surrounding an outer side of a cylinder meeting a second predetermined condition.

Figure 1B:
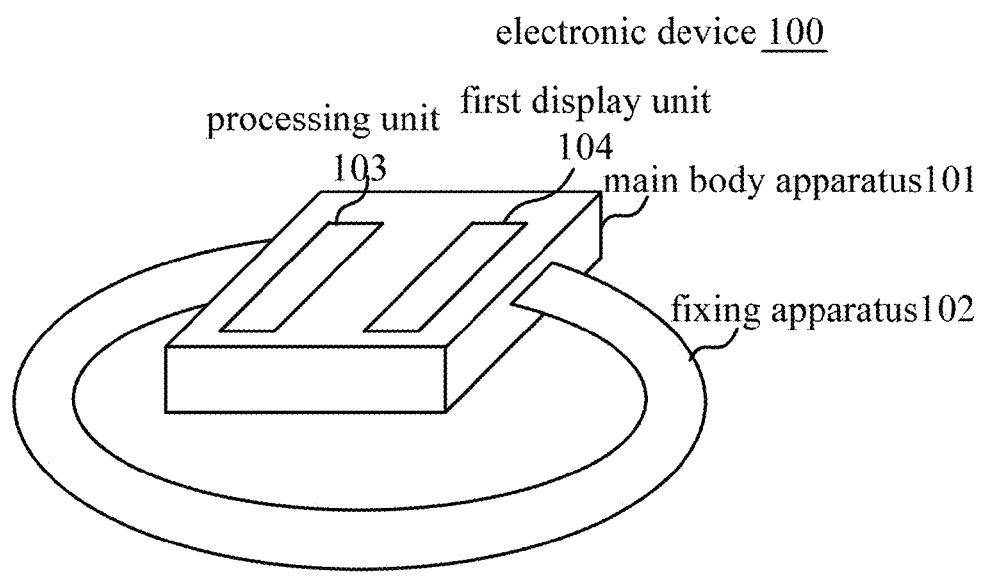
Figure 1C:
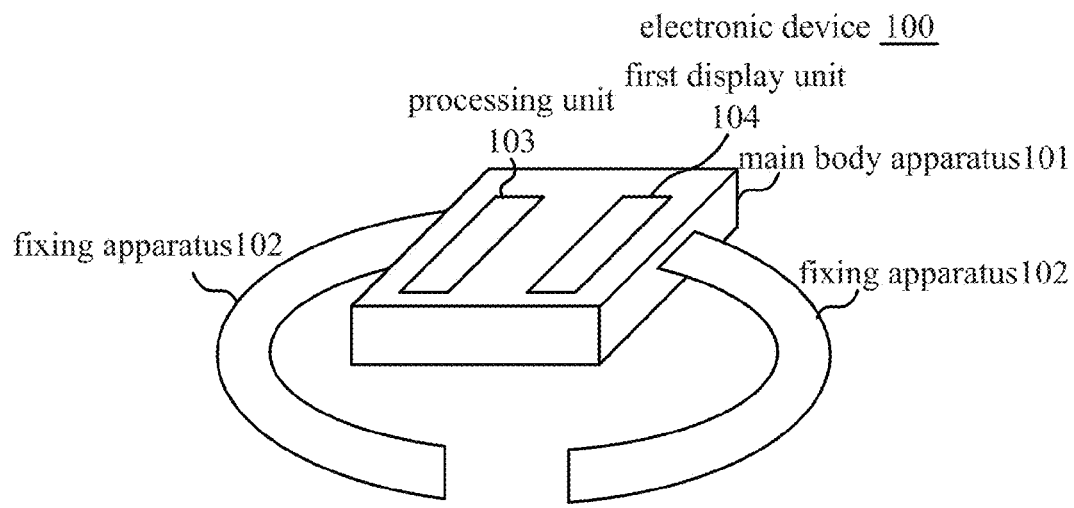

Particularly, FIGS. 1B and 1C are diagrams showing two fixed states in which the fixing apparatus 102 is connected with the main body apparatus 101. In the first fixed state as shown in FIG. 1B, the fixing apparatus 102 and the main body apparatus 101 form a closed-loop annular space. In the second fixed state as shown in FIG. 1C, the fixing apparatus 102 and the main body apparatus 101 form an approximate annular space with a small opening. In an embodiment of the present disclosure, the main body apparatus 101 is a dial section of the smart watch, and the fixing apparatus 102 is a watchband section of the smart watch. The annular space or the approximate annular space formed by the main body apparatus 101 and the fixing apparatus 102 can surround a wrist (as the cylinder) of a user of the smart watch, and the diameter of the annular space or the approximate annular space is larger than the diameter of the wrist of the user and smaller than the diameter of the first of the user.

Figure 1D:
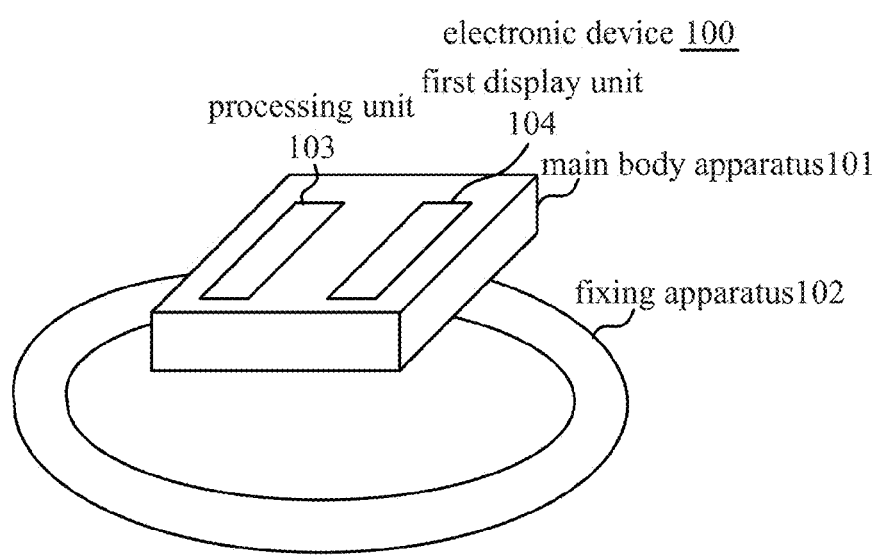
Figure 1E:
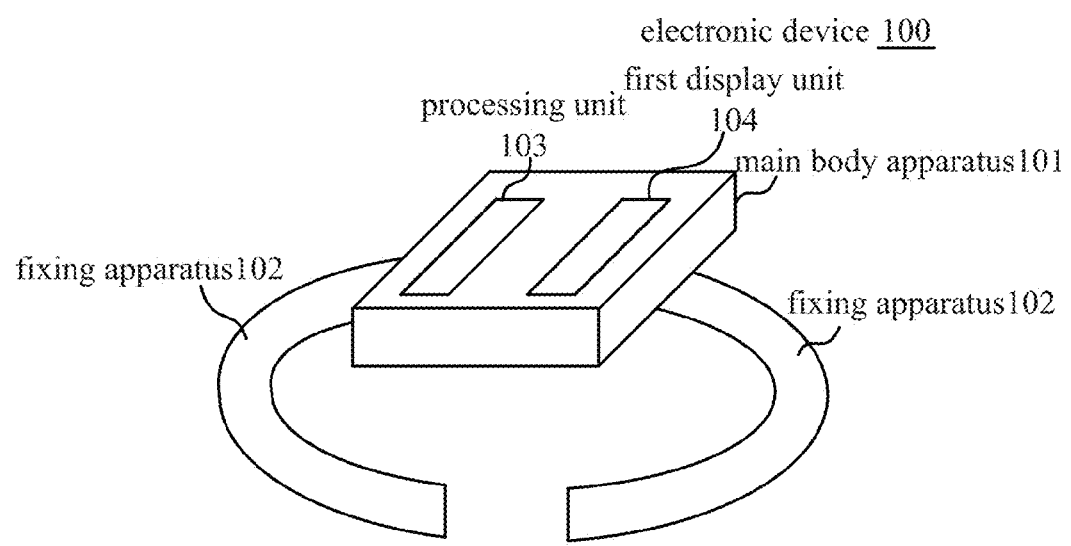

Also, of course, the annular space or the approximate annular space may be formed by the fixing apparatus 102 alone. As shown in FIGS. 1D and 1E, the main body apparatus 101 may be arranged on the fixing apparatus 102 (i.e., the main body apparatus 101 is attached to the fixing apparatus 102 by way of surface contact), so that only the fixing apparatus 102 itself forms the annular space (FIG. 1D) or the approximate annular space (FIG. 1E) surrounding the cylinder from the outside. The fixing apparatus 102 is arranged with a fixing structure such as an agraffe, a snap fastener or a slide fastener, etc. (not shown).

Further, as shown by FIGS. 1A-1E, the main body apparatus 101 is arranged with a processing unit 103 and a first display unit 104 thereon. The processing unit 103 is used to generate a first image and perform display control. In the electronic device 100 shown in FIGS. 1A-1E, the first display unit 104 is arranged on the main body apparatus 101. However, it will be easily understood by those skilled in the art that the present disclosure is not limited thereto. The first display unit 104 may also be arranged on the fixing apparatus 102. The principle and implementation of the first display unit 104 will be described in detail with reference to FIGS. 2A-2D and FIGS. 3A-3C.

Figure 2A:
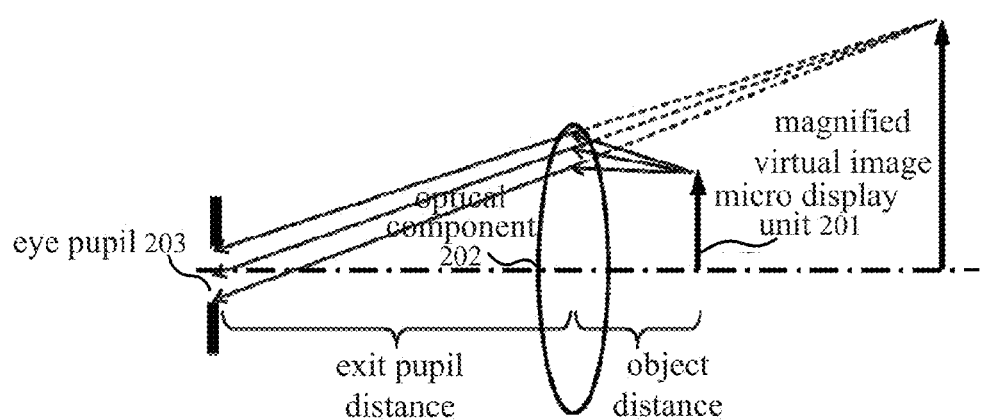
FIGS. 2A-2D are principal diagrams showing a near-to-eye display system applied in the electronic device according to the first embodiment of the present disclosure.

FIG. 2A is a principle diagram showing the near-to-eye optical display system applied in the electronic device according to the first embodiment of the present disclosure. In the electronic device according to the first embodiment of the present disclosure, the near-to-eye optical display system is used as the first display unit 104. As shown in FIG. 2, the light corresponding to the display image emitted by the micro display unit 201 in the near-to-eye optical display system is received via an optical component 202 such as a lens group, and the light path is changed. As a result, the light with the light path changed goes into the pupil 203 of the viewer and a magnified virtual image is formed.

Figure 2B:
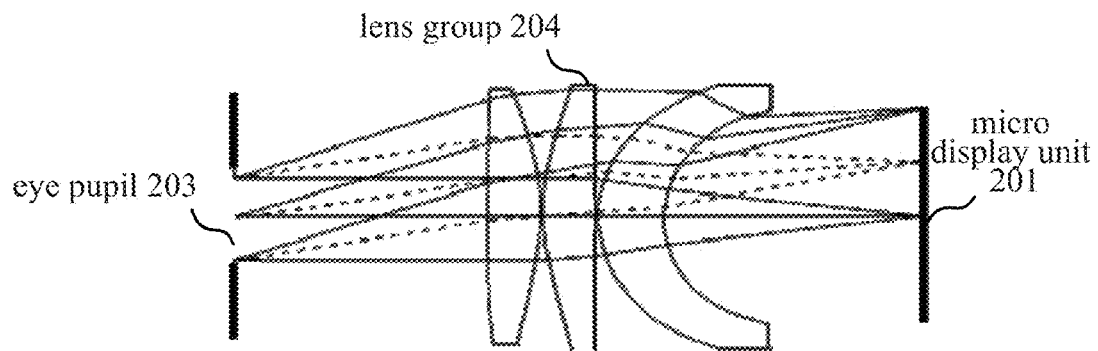
Figure 2C:
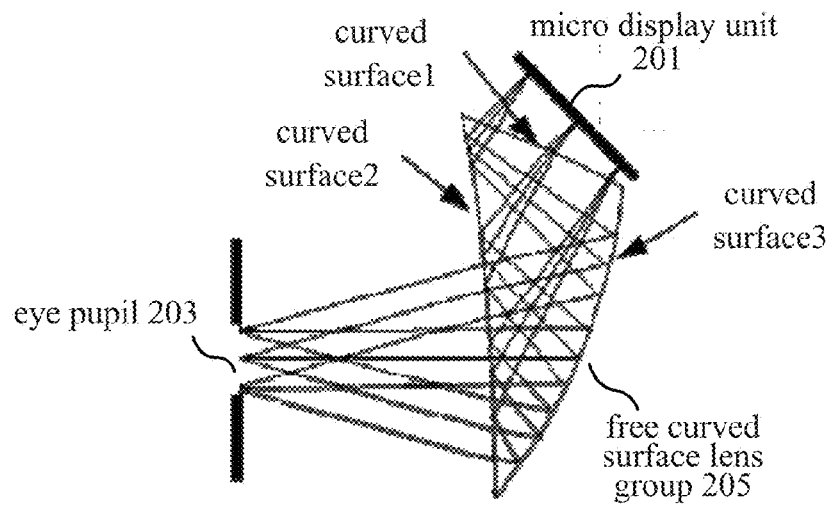
Figure 2D:
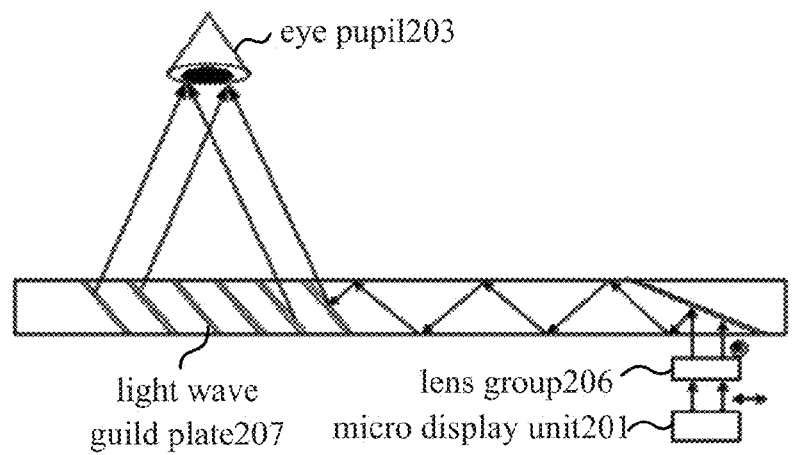

FIGS. 2B-2D further show three detailed implementations based on the principle diagram shown in FIG. 2A. Particularly, the technical solution in FIG. 2B adopts the mixed refraction and diffraction curved surface design, wherein the lens group 204 corresponds to the optical component 202 shown in FIG. 2A, thereby the required glass volume is reduced. The technical solution in FIG. 2C adopts a free curved surface design, wherein a free curved surface lens group 205 including a curved surface 1, a curved surface 2 and a curved surface 3 corresponds to the optical component 202 shown in FIG. 2A, thereby the required glass volume is further reduced. The technical solution in FIG. 2D adopts a parallel plate design, wherein except for the lens group 206 corresponding to the optical component 202 shown in FIG. 2A, a light waveguide plate 207 is also included. By using the light waveguide plate 207, a control such as a translation on the exit direction of the light forming the magnified virtual image (i.e., the display direction of the magnified virtual image) can be performed while the required glass thickness is reduced. It is easily to be understood by those skilled in the art that the near-to-eye optical display system adopted in the electronic device according to the first embodiment of the present disclosure is not limited to those shown in FIGS. 2B-2D, but can adopt other implementations such as the projective eyepiece design.

Figure 3A:
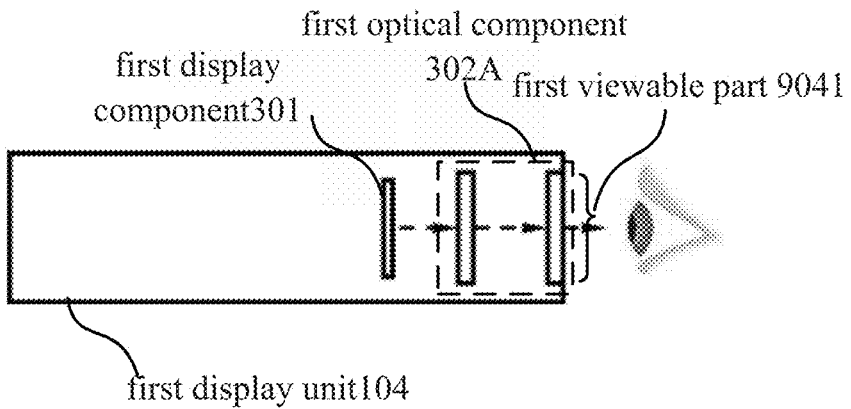
FIGS. 3A-3C are schematic diagrams showing a display unit in the electronic device according to the first embodiment of the present disclosure.
Figure 3B:
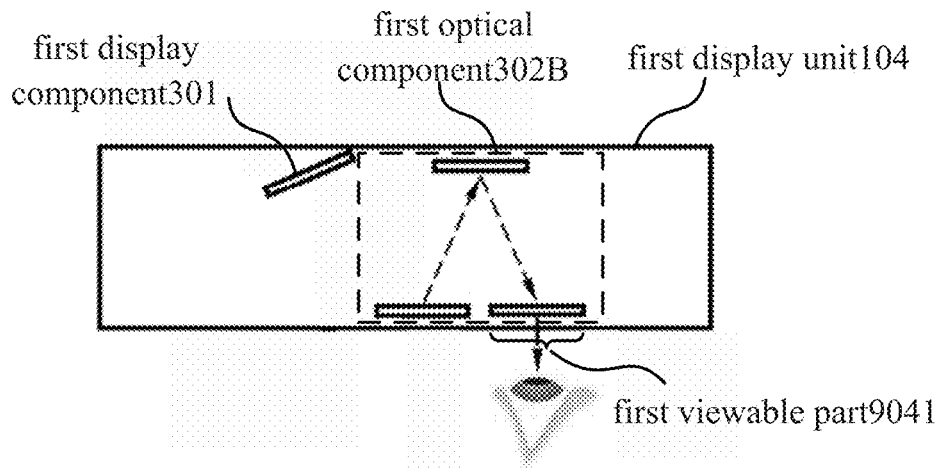
Figure 3C:
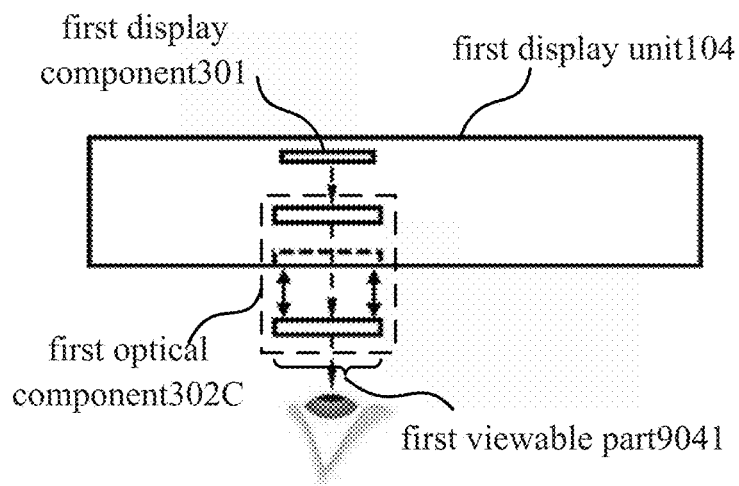

FIGS. 3A-3C are schematic diagrams showing a display unit in the electronic device according to the first embodiment of the present disclosure. The first display unit 104 in the electronic device 100 according to the first embodiment of the present disclosure adopts the near-to-eye optical display system as described above with reference to FIG. 2. The first display unit 104 includes a first display component 301 which displays the first image, and a first optical component 302 (the first optical components 302A-302C in FIGS. 3A-3C) which receives light corresponding to the first image emitted from the first display component 301, and changes the light path of the light corresponding to the first image to form a magnified virtual image corresponding to the first image.

Particularly, in FIG. 3A, the first display component 301 may be the micro display, and the first optical component 302A is formed by the lens group. The lens group forms the magnified virtual image corresponding to the first image displayed by the first display component 301.

In FIG. 3B, the first display component 301 may also be a micro display, and the first optical component 302B is formed by an optical device reflecting multiple times in the electronic device. In this case, compared to the first optical component 302A shown in FIG. 3A, the space necessary for the first display unit 104 may be saved, and it is convenient for the design and manufacture of the further minimized electronic device.

In FIG. 3C, the first display component 301 may also be a micro display, and the first optical component 302C is formed by a zoom lens group driven by a driving unit (not shown) in the electronic device. In this case, compared to the first optical component 302A shown in FIG. 3A, the size of the magnified virtual image displayed by the first display unit 104 may be adjusted dynamically by zooming, so as to meet different user requirements. In this way, by displaying a magnified virtual image using the display component and the optical system, it is not limited by the size of the wearable electronic device such as the smart watch itself, and the image or video display with a larger size and a higher definition is provided with a relatively small display screen. Also, compared to the micro projector for displaying a large image, the power consumption of the electronic device is low, and it is not limited by the usage scene, and well usage privacy is provided.

In the electronic device 100 described above with reference to FIGS. 1A-1C and FIGS. 3A-3C, at least a part of the first optical component 302 is a component the transmittance of which meets a predetermined condition in the outward direction of the annular space or the approximate annular space. The at least a part of the first optical component 302 is a region corresponding to the display image when displaying. More generally, the transmittance of the electronic device 100 meets a predetermined condition in the outward direction of the annular space or the approximate annular space corresponding to the at least a part of the first optical component 302. The predetermined condition may be that the transmittance is larger than or equal to a predetermined value (such as 70%). In this way, the user may see his/her skin through the electronic device 100.

Figure 4:
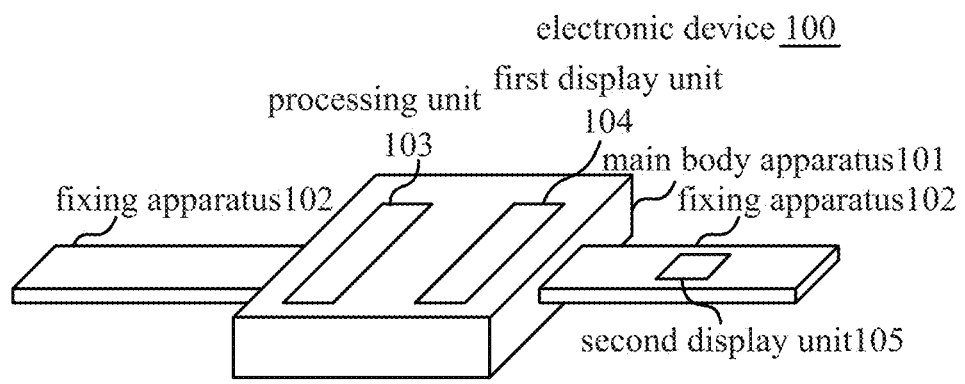
FIG. 4 is a structural diagram showing an electronic device according to a second embodiment of the present disclosure.

FIG. 4 is a structural diagram showing an electronic device according to a second embodiment of the present disclosure. Compared to the electronic device 100 according to the first embodiment of the present disclosure described above with reference to FIGS. 1A-1E, the electronic device 200 according to a second embodiment of the present disclosure shown in FIG. 4 further includes a second display unit 105. The type of the second display unit 105 is different from that of the first display unit 104. For example, the second display unit 105 includes, but not limited to, a liquid crystal display (LCD) unit, an organic electro luminesence display unit, an organic light emitting diode (OLED) display unit, or an E Ink type display unit, etc.

One of the first display unit 104 and the second display unit 105 is arranged on the main body apparatus 101, and the other one is arranged on the fixing apparatus 102. As shown in FIG. 4, the first display unit 104 is arranged on the main body apparatus 101, and the second display unit 105 is arranged on the fixing apparatus 102. Of course, the second display unit 105 may be arranged on the main body apparatus 101, and the first display unit 104 is arranged on the fixing apparatus 102. Similarly to the first display unit 104, the display direction of the second display unit 105 is the outward direction of the annular space or the approximate annular space. Generally, the second display unit 105 is used to display content which does not need to be magnified, such as time indication, etc.

Also, it is not limited to the case shown in FIG. 4, the first display unit 104 and the second display unit 105 may be arranged on the main body apparatus 101 or the fixing apparatus 102 at the same time. For example, the first display unit 104 and the second display unit 105 are arranged on the main body apparatus 101 side by side. Alternatively, the first display unit 104 and the second display unit 105 are arranged on two opposite locations across the radial direction of the fixing apparatus 102.

Figure 5:
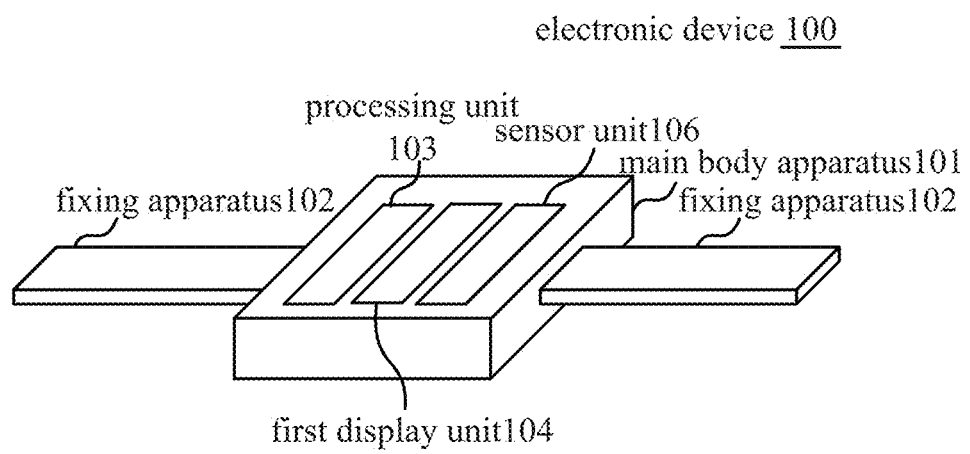
FIG. 5 is a structural diagram showing an electronic device according to a third embodiment of the present disclosure.

FIG. 5 is a structural diagram showing an electronic device according to a third embodiment of the present disclosure. Compared to the electronic device 100 according to the first embodiment of the present disclosure described above with reference to FIGS. 1A-1E, the electronic device 300 according to a third embodiment of the present disclosure shown in FIG. 5 further includes a sensor unit 106. As shown in FIG. 5, the sensor unit 106 is arranged on the main body apparatus 101. However, the sensor unit 106 may also be arranged on the fixing apparatus 102.

The sensor unit 106 is used to generate a first control signal when sensing that the first predetermined condition is met. The processing unit 103 controls the on/off of the first display unit 104 according to the first control signal. In an embodiment of the present disclosure, the sensor unit 106 is an acceleration sensor, the acceleration component value in the gravity direction of the first control signal is larger than or equal to a predetermined value (that is, the user pulls down the electronic device 100 from the use state in which the first display unit 104 is watched), and the processing unit 103 controls to turn down the first display unit 104 according to the first control signal. It will be easily understood by those skilled in the art that the sensor unit 106 according to the embodiment of the present disclosure is not limited to the acceleration sensor, but may include other sensor unit which can generate the control signal.

Figure 6A:
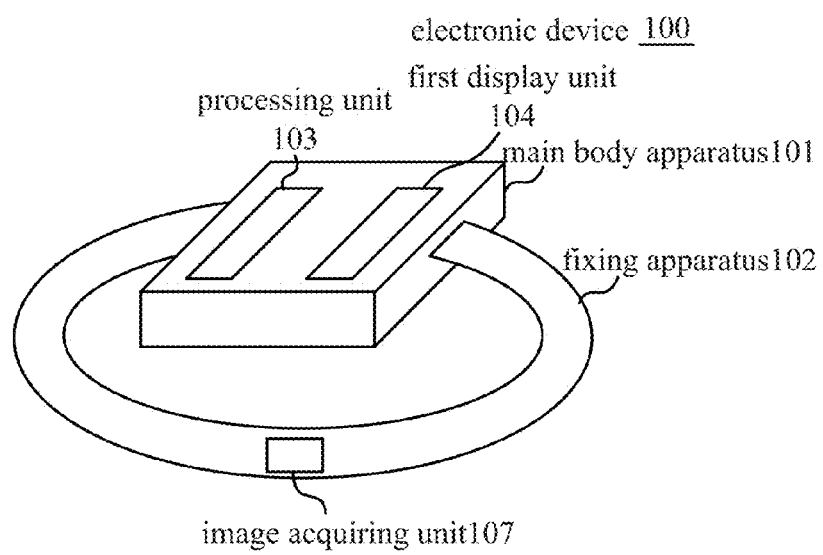
FIGS. 6A and 6B are structural diagrams showing an electronic device according to a fourth embodiment of the present disclosure.
Figure 6B:
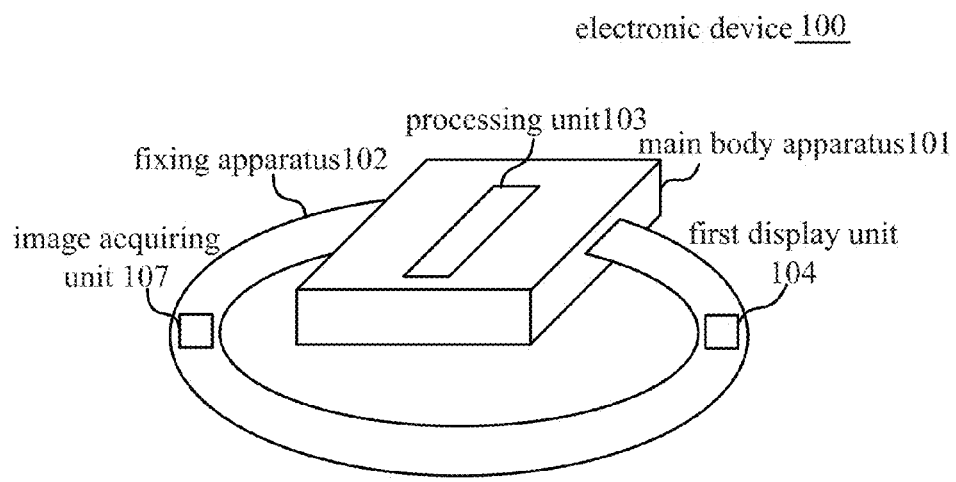

FIGS. 6A and 6B are structural diagrams showing an electronic device according to a fourth embodiment of the present disclosure. Compared to the electronic device 100 according to the first embodiment of the present disclosure described above with reference to FIGS. 1A-1E, the electronic device 400 according to the fourth embodiment of the present disclosure shown in FIGS. 6A and 6B further includes an image capturing unit 107. The image capturing unit 107 may be arranged on the main body apparatus 101 or the fixing apparatus 102. Particularly, FIG. 6A shows the case in which the first display unit 104 is arranged on the main body apparatus 101 and the image capturing unit 107 is arranged on the fixing apparatus 102. FIG. 6B shows the case in which both the first display unit 104 and the image capturing unit 107 are arranged on the fixing apparatus 102. No matter the case in FIG. 6A or FIG. 6B, the image capturing direction of the image capturing unit 107 is opposite to an image output direction of the first display unit 104 in the radial direction of the annular space or the approximate annular space.

In an embodiment of the present disclosure, the image capturing unit 107 is used to capture an interaction action of the user to generate a first image capturing signal, the processing unit 103 converts the first image capturing signal into a second control signal to control the first display unit 104 to display the second image.

In another embodiment of the present disclosure, the image capturing unit 107 is used to capture a first sub image in the image capturing direction, and the processing unit 103 generates a second sub image which may be an identification image about the first sub image acquired by analyzing the first sub image, and may also be an identification image acquired based on the sensor such as the GPS sensor. Also, the second sub image may also be an identification image acquired from a server through network based on feature information acquired from the first sub image. The first sub image is superimposed with the second sub image to generate the first image for display by the first display unit 104.

Figure 7:
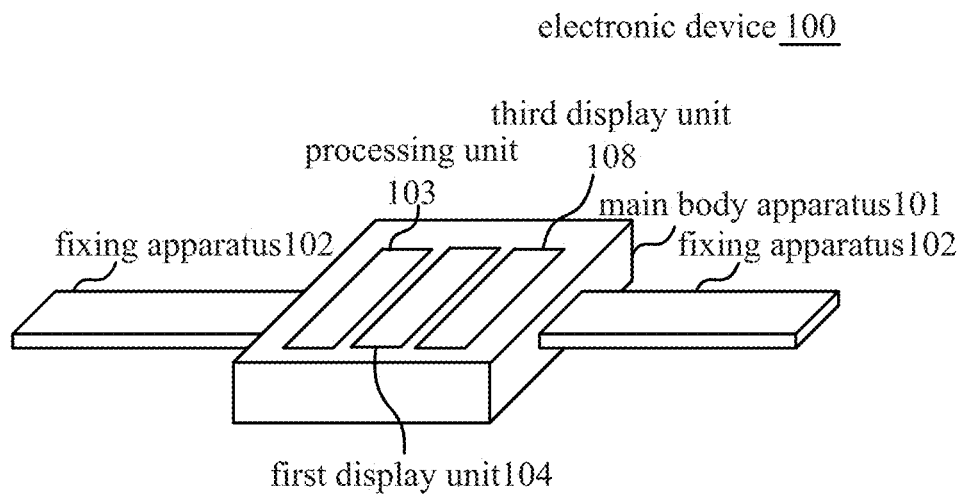
FIG. 7 is a structural diagram showing an electronic device according to a fifth embodiment of the present disclosure.

FIG. 7 is a structural diagram showing an electronic device according to a fifth embodiment of the present disclosure. Compared to the electronic device 100 according to the first embodiment of the present disclosure described above with reference to FIGS. 1A-1E, the electronic device 500 according to the fifth embodiment of the present disclosure shown in FIG. 7 further includes a third display unit 108. In the electronic device 100 shown in FIG. 7, the third display unit 108 is arranged on the main body apparatus 101 together with the first display unit 104. It will be easily understood that the present disclosure is not limited thereto. The third display unit 108 may be arranged on the fixing apparatus 102 together with the first display unit 104.

The third display unit 108 is a display unit with the same type as that of the first display unit 104. That is, the third display unit includes a second display component (not shown) for displaying the third image, and a second optical component (not shown) for receiving light corresponding to the third image emitted from the second display component and changing the light path of the light corresponding to the third image to form a magnified virtual image corresponding to the third image. The third image is related to the first image. When both eyes of the viewer watches the first display unit 104 and the third display unit 108 respectively, the viewer is enabled to be aware of a 3D image corresponding to the first image and the third image.

The electronic device according to the embodiments of the present disclosure has been described above with reference to FIGS. 1A to 7. In the following, the display method used by the electronic device will be described with reference to FIG. 8.

Figure 8:
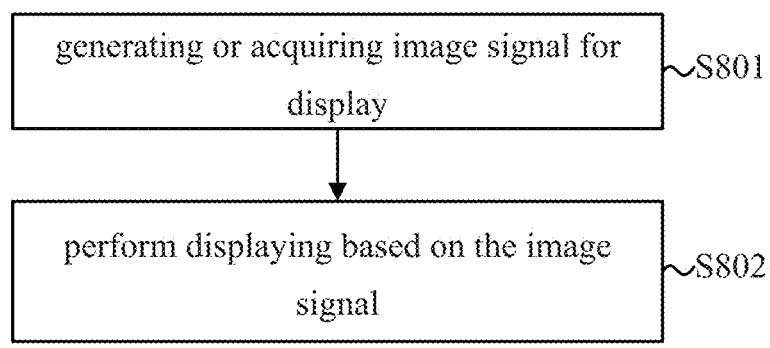
FIG. 8 is a flowchart showing a display method according to a first implementation of the present disclosure.

FIG. 8 is a flowchart showing the display method according to an embodiment of the present disclosure. The display method shown in FIG. 8 is applied to the electronic device shown in FIG. 1. As described above, the electronic device includes a main body apparatus having a processing unit which generates a first image and performs display control; a fixing apparatus connected with the main body apparatus, having at least a fixed state in which the fixing apparatus can be at least a part of an annular space or an approximate annular space meeting a first predetermined condition, the annular space or the approximate annular space being capable of surrounding an outer side of a cylinder meeting a second predetermined condition; and a first display unit arranged on the main body apparatus or the fixing apparatus, which outputs the first image, wherein the first display unit comprises a first display component which displays the first image, and a first optical component which receives light corresponding to the first image emitted from the first display component, and changes the light path of the light corresponding to the first image to form a magnified virtual image corresponding to the first image.

The display method includes generating or acquiring an image signal for display (step S801); and performing display based on the image signal (step S802).

In the step S801, the processing unit 103 of the electronic device 100 may generate an image signal for display. Also, the electronic device 100 may acquire the image signal for display from the server or another electronic device through a communication unit. Then, the process goes to the step S802.

In the step S802, the display unit of the electronic device 100 performs displaying based on the image generated or acquired in the step S801. Particularly, as described above, the step of performing displaying may include displaying a magnified virtual image corresponding to the image signal through the display unit including the display component and the optical component. Also, the step of performing displaying may further include generating a control signal based on the signal acquired by the sensor to control the on/off of the display of the image signal, etc. Further, the step of performing displaying may further include displaying a magnified 3D virtual image corresponding to the image signal through two display units including the display component and the optical component.

(Second Implementation)

Next, the electronic device according to an embodiment of the present disclosure will be described with reference to FIGS. 9A-9D. The electronic device according to an embodiment of the present disclosure may be applied to a wearable electronic device such as the smart watch. Of course, it will be easily understood by those skilled in the art that the electronic device according to an embodiment of the present disclosure is not limited thereto, and can include any electronic device having a display unit therein.

FIGS. 9A-9D are structural diagrams showing an electronic device according to a sixth embodiment of the present disclosure. As shown in FIGS. 9A-9D, the electronic device 900 according to the embodiment of the present disclosure includes a main body apparatus 901 and a first fixing apparatus 902. The first fixing apparatus 902 is connected with the main body apparatus 901, which maintains a relative location relationship between the electronic device 900 and at least a part of body of a user when the user wears the electronic device 900. The first fixing apparatus 902 may be of a rigid structure or a flexible structure, as described below with reference to FIGS. 10A-10D and FIGS. 11A and 11B. For example, when the electronic device 900 is the smart watch, the first fixing apparatus 902 is used to maintain the smart watch at a corresponding location of the user wrist. When the electronic device 900 is a smart glass or a head held display, the first fixing apparatus 902 is used to maintain the smart glass or the head held display at a corresponding location of the user head. Also, the first fixing apparatus 902 may be in a non-fixed state expect for the fixed state in which it maintains the relative location relationship between the electronic device 900 and at least a part of body of a user. For example, when the first fixing apparatus 902 is a watch chain of the smart watch, it may be in the non-fixed state in which the watch chain is open.

In the following, a first configuration example to a fourth configuration example of the main body apparatus 901 and the first fixing apparatus 902 will be further described with reference to FIGS. 10A-10D. In FIGS. 10A-10D, for the convenience of the description, only the main body apparatus 901 and the first fixing apparatus 902 in the electronic device 900 are shown.

Figure 10A:
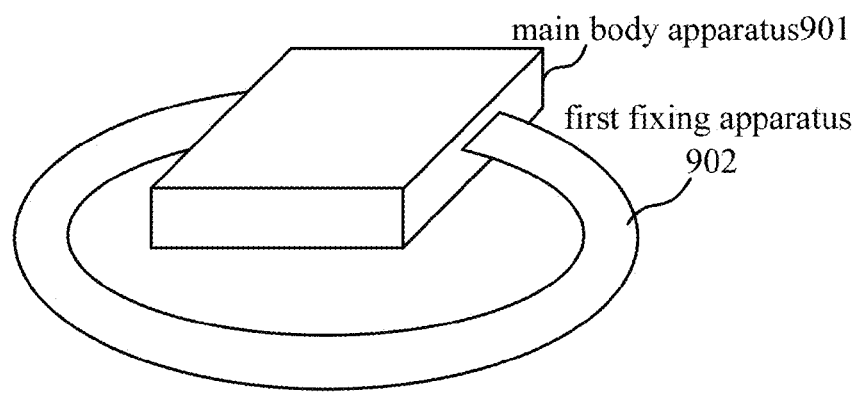
FIGS. 10A-10D are structural diagrams showing a first configuration example to a fourth configuration example of a main body apparatus and a fixing apparatus in the electronic device according to the sixth embodiment of the present disclosure, respectively.
Figure 10B:
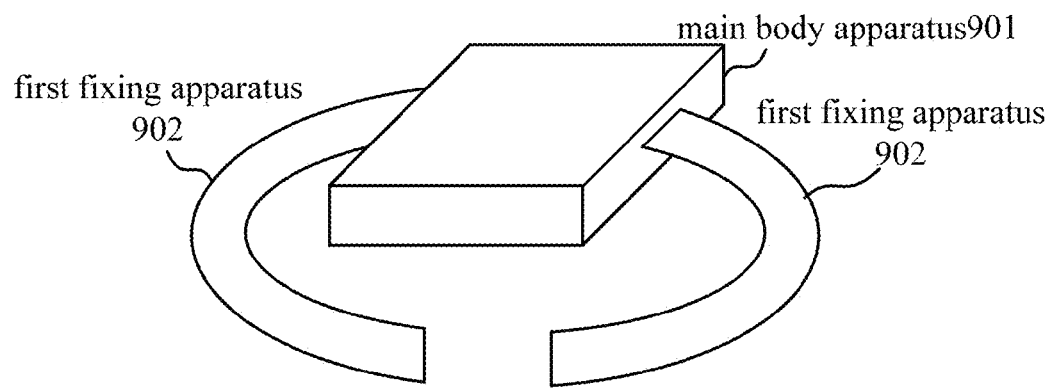

Particularly, FIGS. 10A and 10B show two fixed state of connection between the main body apparatus 901 and the first fixing apparatus 902, respectively. In the first fixed state as shown in FIG. 10A, the first fixing apparatus 902 and the main body apparatus 901 form a closed-loop annular space, wherein the first fixing apparatus 902 and the main body apparatus 901 form a part of the annular space, respectively. In the second fixed state as shown in FIG. 10B, the first fixing apparatus 902 and the main body apparatus 901 form an approximate annular space with a small opening, wherein the first fixing apparatus 902 and the main body apparatus 901 form a part of the annular space, respectively. In an embodiment of the present disclosure, the main body apparatus 901 is a dial section of the smart watch, and the first fixing apparatus 902 is a watchband section of the smart watch. The annular space or the approximate annular space formed by the main body apparatus 901 and the first fixing apparatus 902 can surround a wrist (as the cylinder) of a user of the smart watch, and the diameter of the annular space or the approximate annular space is larger than the diameter of the wrist of the user and smaller than the diameter of the first of the user.

Figure 10C:
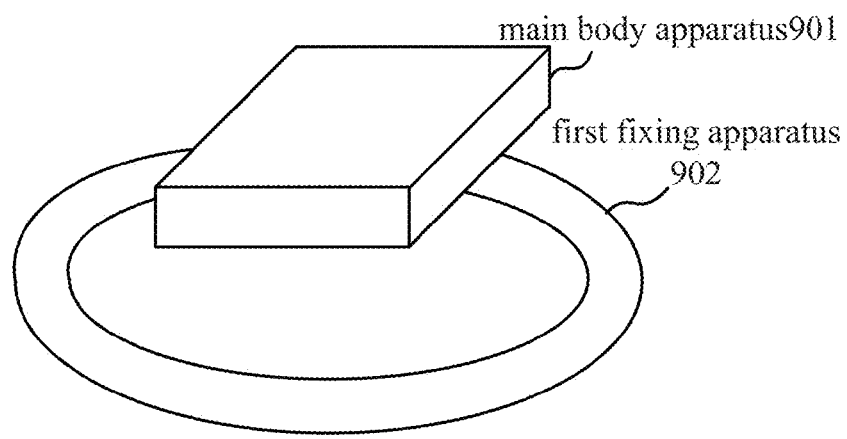
Figure 10D:
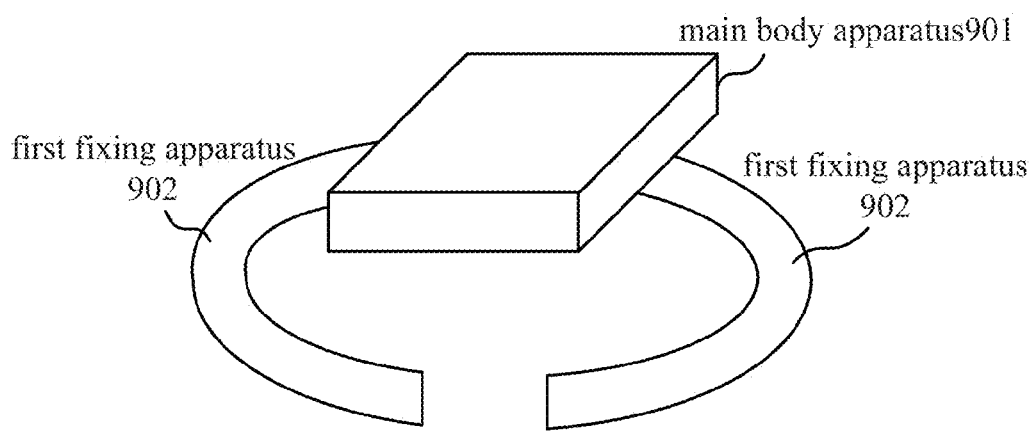

Also, of course, the annular space or the approximate annular space may be formed by the first fixing apparatus 902 alone. As shown in FIGS. 10C and 10D, the main body apparatus 901 may be arranged on the first fixing apparatus 902 (i.e., the main body apparatus 901 is attached to the first fixing apparatus 902 by contact with its surface), so that only the first fixing apparatus 902 itself forms the annular space (FIG. 10C) or the approximate annular space (FIG. 10D) surrounding the cylinder from the outside. The first fixing apparatus 902 is arranged with a fixing structure such as an agraffe, a snap fastener or a slide fastener, etc. (not shown).

Back to FIGS. 9A-9D, the configuration of the electronic device 900 will be further described.

Figure 9A:
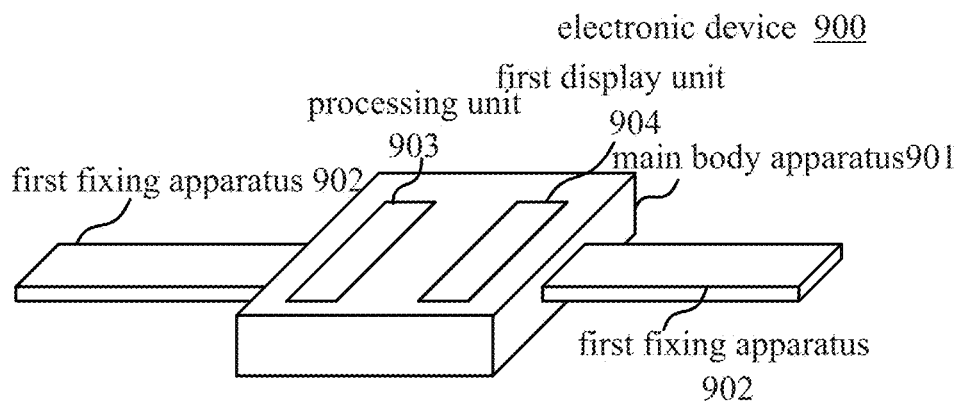
FIGS. 9A-9D are structural diagrams showing an electronic device according to a sixth embodiment of the present disclosure.

As shown in FIG. 9A, the main body apparatus 901 is arranged with a processing unit 903 and a first display unit 904 thereon. The processing unit 903 is used to generate a first image and perform display control. In the electronic device 900 shown in FIG. 9, the first display unit 904 is arranged on the main body apparatus 901. However, it will be easily understood by those skilled in the art that the present disclosure is not limited thereto, and the first display unit 904 may also be arranged on the first fixing apparatus 902. Further, the first display unit 904 may be arranged on the main body apparatus 901 and the first fixing apparatus 902. As described above with reference to FIGS. 3A-3C, the first display unit 904 may further include a first display component 301 and a first optical component 302, and the first display component 301 and the first optical component 302 may be connected by an optical path formed by a flexible optical waveguide. Therefore, the first display component 301 and the first optical component 302 in the first display unit 904 may be arranged separately. That is, the first display component 301 may be arranged at the main body apparatus 901, and the first optical component 302 may be arranged at the first fixing apparatus 902. Alternatively, the first display component 301 may be arranged at the first fixing apparatus 902, and the first optical component 302 may be arranged across the main body apparatus 901 and the first fixing apparatus 902, vice versa.

Figure 9B:
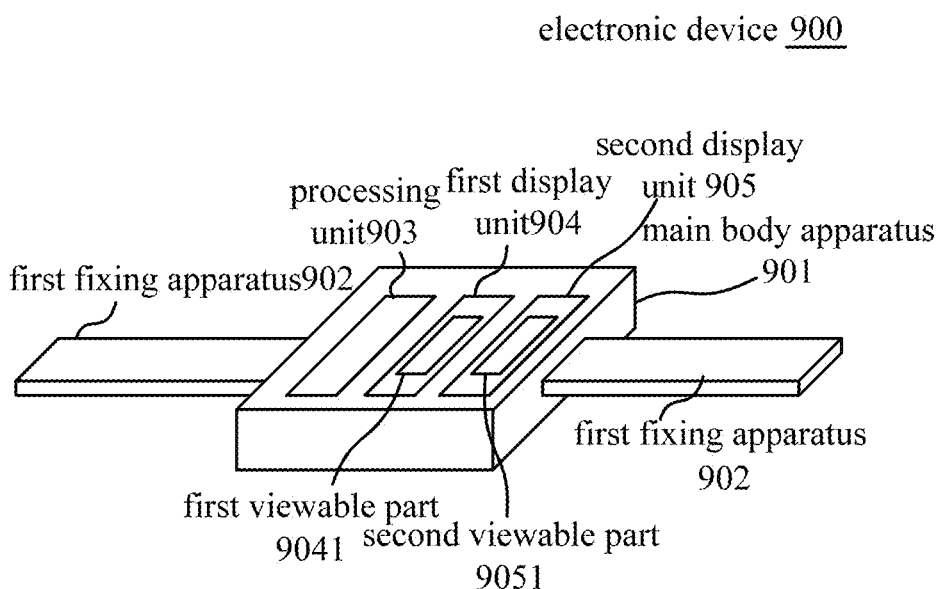
Figure 9C:
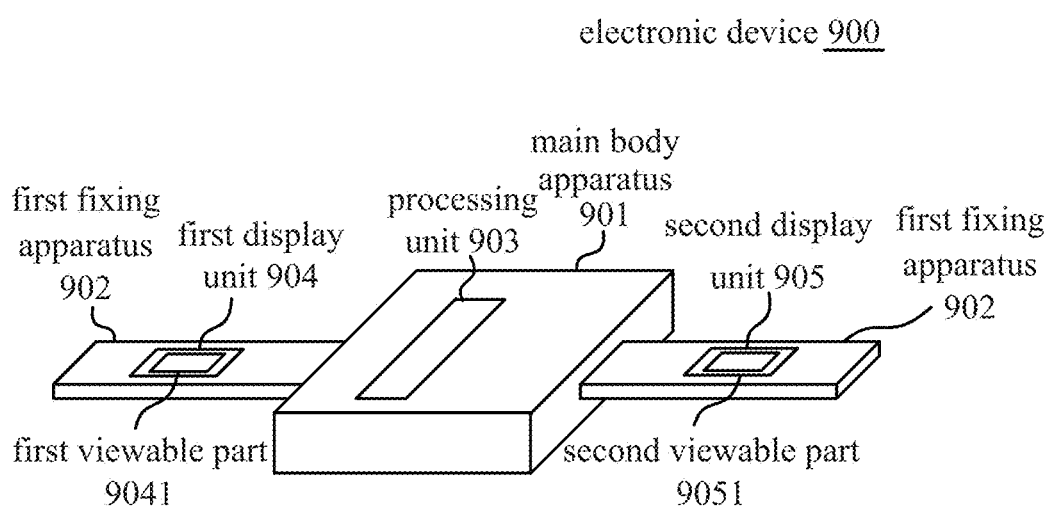
Figure 9D:
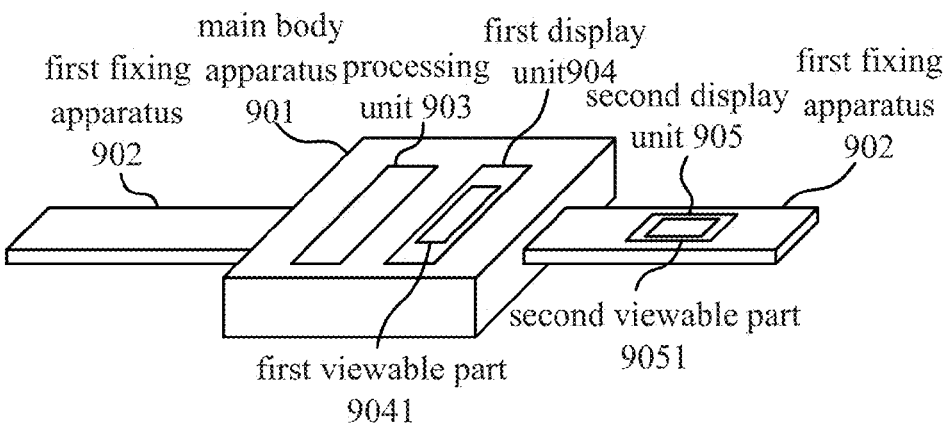

Also, the electronic device 900 is not limited to include only one display unit. The electronic device 900 according to the embodiment of the present disclosure may further include a second display unit. As shown in FIGS. 9B-9D, the main body apparatus 901 is arranged with the processing unit 903, the first display unit 904 and the second display unit 905 thereon. The processing unit 903 is used to generate image to be displayed and perform display control. The first display unit 904 and the second display unit 905 are used to output the first image and the second image, respectively. Particularly, a first viewable part 9041 of the first display unit 904 and a second viewable part 9051 of the second display unit 905 are arranged on the main body apparatus 901 (shown in FIG. 9B), or the first viewable part 9041 and the second viewable part 9051 are arranged on the first fixing apparatus 902 (FIG. 9C), or one of the first viewable part 9041 and the second viewable part 9051 is arranged on the main body apparatus 901, and the other one of the first viewable part 9041 and the second viewable part 9051 is arranged on the first fixing apparatus 902 (FIG. 9D). The first viewable part 9041 and the second viewable part 9051 are sections in the first display unit 904 and the second display unit 905 which are viewed by the user to get the display content. That is, the first display unit 904 and the second display unit 905 described in the following include multiple components depending on its principle, wherein the first viewable part 9041 and the second viewable part 9051 are regions displaying the image content viewed by the user practically.

The first display unit 904 and the second display unit 905 are optionally display units following different display principles. The first display unit 904 adopts near-to-eye optical display system. The second display unit 905 includes, but not limited to, a liquid crystal display (LCD) unit, an organic electro luminesence display unit, an organic light emitting diode (OLED) display unit, or an E Ink type display unit, etc.

The basic structure configuration and the display principle of the electronic device according to the embodiment of the present disclosure have been described above with reference to FIGS. 9 and 10. In the following, the detailed configuration and the adjusting manner of the fixing apparatus in the electronic device according to the embodiment of the present disclosure will be described in detail with reference to FIG. 11.

FIGS. 11A-11D are schematic diagrams showing the detailed configuration of the fixing apparatus in the electronic device according to the sixth embodiment of the present disclosure.

Figure 11A:
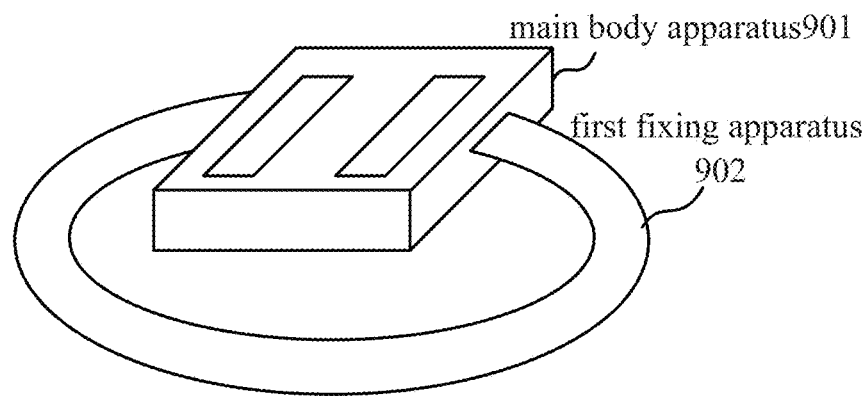
FIGS. 11A-11D are schematic diagrams showing a detailed configuration of the fixing apparatus in the electronic device according to the sixth embodiment of the present disclosure.

As shown in FIG. 11A, the first fixing apparatus 902 has at least a first fixed state in which the first fixing apparatus 902 can be at least a part of an annular space or an approximate annular space meeting a first predetermined condition, the annular space or the approximate annular space being capable of surrounding an outer side of a cylinder meeting a second predetermined condition.

Particularly, the first fixing apparatus 902 and the main body apparatus 901 form a closed-loop annular space, wherein the first fixing apparatus 902 and the main body apparatus 901 form a part of the annular space, respectively. Alternatively, the first fixing apparatus 902 and the main body apparatus 901 form an approximate annular space with a small opening, wherein the first fixing apparatus 902 and the main body apparatus 901 form a part of the approximate annular space, respectively. Alternatively, the annular space or the approximate annular space may be formed by the first fixing apparatus 902 alone. In an embodiment of the present disclosure, the main body apparatus 901 is a dial section of the smart watch, and the first fixing apparatus 902 is a watchband section of the smart watch. The annular space or the approximate annular space formed by the main body apparatus 901 and the first fixing apparatus 902 can surround a wrist of a user of the smart watch as the cylinder. In the case of the approximate annular space, a first predetermined condition that the gap of the annular cycle of the annular space be smaller than the diameter of the cylinder to be surrounded should be met. Also, a second predetermined condition that the diameter of the annular space or the approximate annular space be larger than the diameter of the wrist of the user and smaller than the diameter of the first of the user should be met.

In order to realize the goal that the electronic device 900 can provide different wearing manners according to usage scenes and user requirements, the diameter of the annular space or the approximate annular space formed by the first fixing apparatus 902 shown in FIG. 11A is variable. Optionally, the difference between the maximum and the minimum of the diameter is larger than a predetermined threshold. For example, the first fixing apparatus 902 may fix the electronic device 900 at the user wrist, or fix the electronic device 900 at the user head when the user needs to watch for a long time or expects to watch without his/her hands occupied. When fixing the electronic device 900 at the user wrist, the diameter of the annular space or the approximate annular space should be about 10 cm. When fixing the electronic device 900 at the user head, the diameter of the annular space or the approximate annular space should be about 30 cm. The diameter of the annular space or the approximate annular space formed by the first fixing apparatus 902 has a maximum of about 30 cm and a minimum of about 10 cm. The difference between the maximum and the minimum is larger than the predetermined threshold. For example, the predetermined threshold may be 10 cm in minimum, and may optionally be 20 cm. Alternatively, the predetermined threshold may be that the maximum is twice of the minimum and optionally three times of the minimum. That is, the first fixing apparatus 902 may provide the user with an adaptive adjustment range large enough to meet different usage scenes.

Figure 11B:
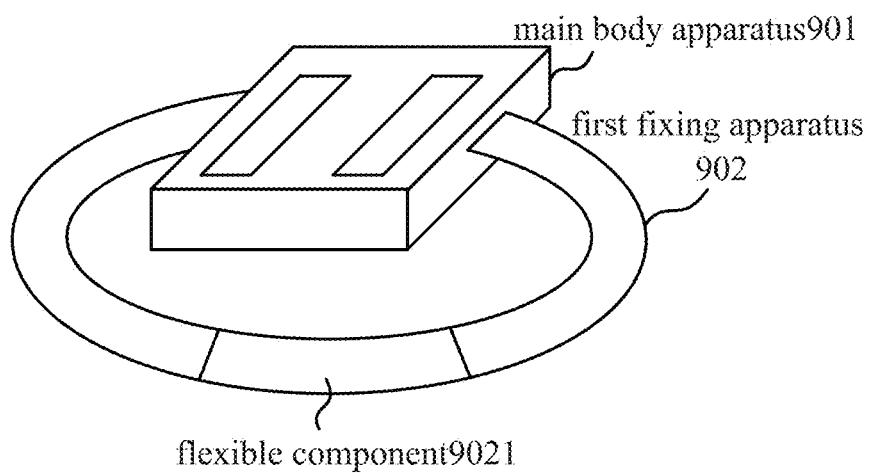
Figure 11C:
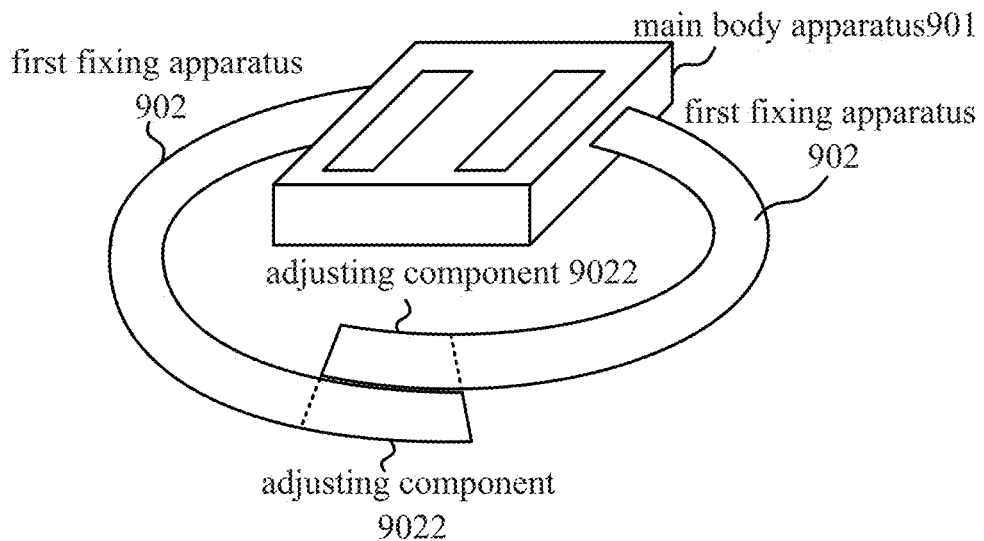
Figure 11D:
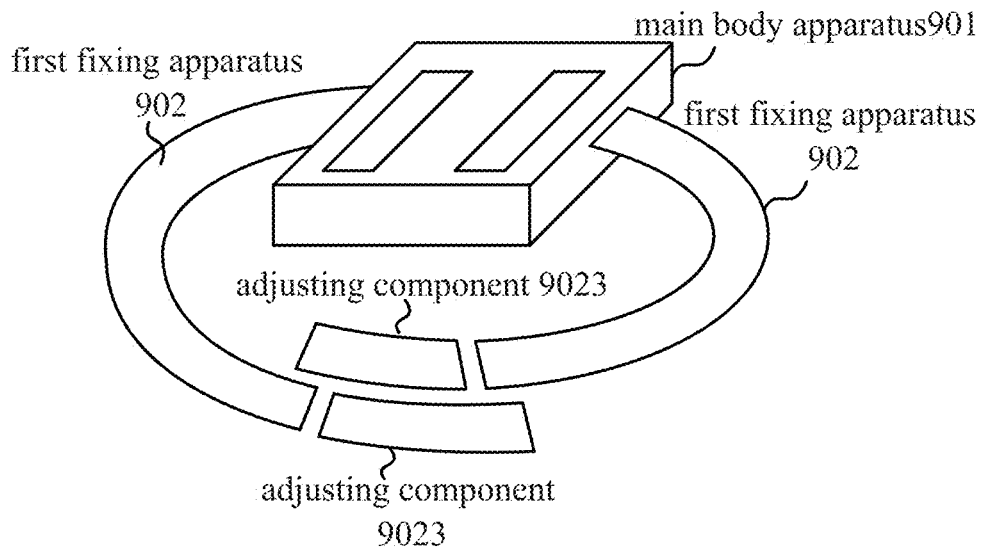

FIGS. 11B-11D illustrate several manners to realize the first fixing apparatus 902 having an adjustment range large enough in FIG. 11A.

As shown in FIG. 11B, the first fixing apparatus 902 includes at least one flexible unit 9021. The at least one flexible unit 9021 has a relaxed first state in which the diameter of the annular space or the approximate annular space is the maximum, and a tight second state in which the diameter of the annular space or the approximate annular space is the minimum.

More particularly, the at least one flexible unit 9021 may be formed by multiple discrete sub flexible units, or may be only one integrate flexible unit. In the case of multiple discrete sub flexible units, further, multiple discrete sub flexible units accommodating flexible space connected by a spin axis or multiple discrete sub flexible units accommodating non-flexible space connected flexibly are included.

As shown in FIGS. 11C and 11D, the first fixing apparatus 902 may further comprise an adjusting unit 9022 or an adjusting unit 9023, which controls the diameter of the annular space or the approximate annular space to change between the maximum and the minimum. In the case shown in FIG. 11, the adjusting unit 9022 is a component such as a buckle of a strap, which realizes the control of the diameter of the annular space or the approximate annular space by controlling the length of the overlapped part in the first fixing apparatus 902. In an embodiment of the present disclosure, the adjusting unit 9022 may be a rigid component with a part the upper part of which may be overlapped with the lower part. When it is necessary to be fixed to a cylinder with a large diameter, the length of the overlapped part may be reduced smaller, even to a state in which it is entirely extended with no overlapped part, to form a diameter of a larger annular space or the approximate annular space. On the contrary, when it is necessary to be fixed to a cylinder with a small diameter, the length of the overlapped part may be increased larger, even to form a part with three or more layers overlapped, to form a diameter of a smaller annular space or the approximate annular space. When the adaptive adjustment has been done according to the cylinder to be fixed to, the adjusting unit 9022 may be fixed rigidly.

In the case shown in FIG. 11D, the adjusting unit 9023 is for example an extended component, which realizes the control of the diameter of the annular space or the approximate annular space by extending the length itself when necessary. In an embodiment of the present disclosure, the adjusting unit 9023 may include a cavity accommodated with an extendable component such as a roller. The extendable component such as the roller may be extended according to the diameter of the cylinder to be fixed to. When it is necessary to be fixed to a cylinder with a large diameter, parts wrapped around the roller may be pulled off, to form a diameter of a larger annular space or the approximate annular space. On the contrary, when it is necessary to be fixed to a cylinder with a small diameter, more part may be wrapped around the roller to form a diameter of a smaller annular space or the approximate annular space. Also, it is easy to be understood that the first fixing apparatus according to the embodiment of the present disclosure is not limited thereto, and may include an external extended component, which may be connected or disconnected according to the diameter of the cylinder to be fixed to.

Also, the manner of forming the annular space or the approximate annular space is not limited in the fixing apparatus according to the embodiment of the present disclosure. In an embodiment of the present disclosure, the main body apparatus 901 may be coupled to different fixing apparatuses through a connection unit to form different usage states to adapt to different wearing manners.

Figure 12A:
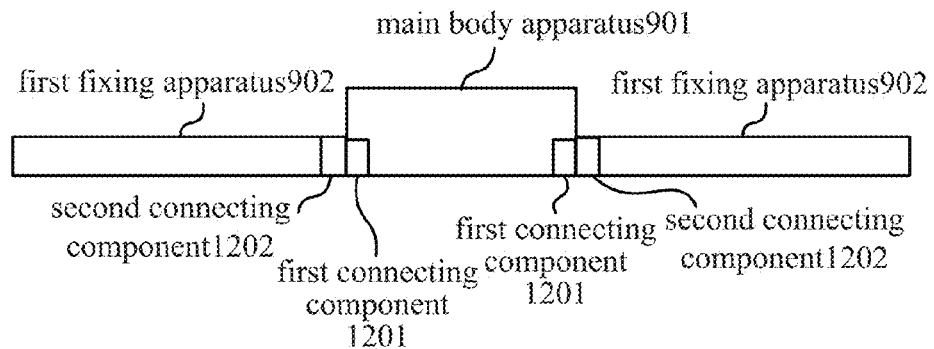
FIGS. 12A and 12B are schematic diagrams showing a detailed configuration of the fixing apparatus in the electronic device according to a seventh embodiment of the present disclosure.

As shown in FIG. 12A, the main body apparatus 901 includes a first connecting unit 1201, the first fixing apparatus 902 includes a second connecting unit 1202, the main body apparatus 901 and the first fixing apparatus 902 are connected with each other through the coupling between the first connecting unit 1201 and the second connecting unit 1202. In an embodiment of the present disclosure, the main body apparatus 901 is a dial section of a smart watch, the first fixing apparatus 902 is a watchband section of the smart watch, and the first connecting unit 1201 and the second connecting unit 1202 are the riveting component of the dial and the watch band.

Figure 12B:
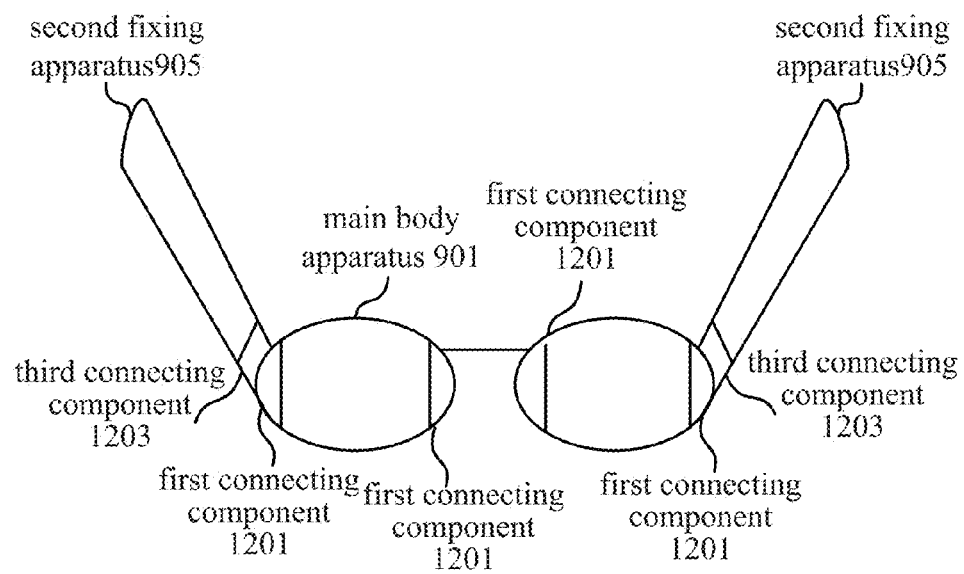

As shown in FIG. 12B, the electronic device 900 may have a usage state different from that shown in FIG. 12A. The main body apparatus 901 may be discoupled with the first fixing apparatus 902, but forms a second fixed state through a coupling by a third connection unit 1203 in the second fixing apparatus 905 and the first connecting unit 1201.

The main body apparatus 901 may include a first sub apparatus and a second sub apparatus which are connected with each other through a sub connection apparatus. The relative locations of the first sub apparatus and the second sub apparatus are changeable. Particularly, in the examples shown in FIGS. 12A and 12B, in an embodiment of the present disclosure, the main body apparatus 901 include the first sub apparatus and the second sub apparatus which may be turned over or slide horizontally. When the relative locations of the first sub apparatus and the second sub apparatus are changed (i.e., turned over or slide), it is switched from an overlapped state to a non-overlapped state. The two sides of the two sub apparatuses each are arranged with the first connecting unit 1201. When it is necessary to be coupled with the second fixing apparatus 905, the main body apparatus 901 is extended. For example, it is extended from the dial-like look shown in FIG. 12A to a glass-like look shown in FIG. 12B. Accordingly, the second fixing apparatus 905 may be formed by two to three sub parts. For example, when the main body apparatus 901 is extended to be the whole front part of the smart glass, the second fixing apparatus 905 is the two support parts connecting at two sides of the smart glass (i.e., the temple and the nosepiece). Also, when the main body apparatus 901 is a part of the whole front part of the smart glass, the main body apparatus 901 may be fixed to the second fixing apparatus 905 as a piece of the glass or a part of a piece of the glass (e.g., embedded with the edges entirely corresponding with each other, or installed through the corresponding interface) (not shown in detail). In this case, the second fixing apparatus 905 is three support parts (i.e., the temple, the frame and the nosepiece) connecting at the two sides and the middle of the smart glass. In the second fixed state shown in FIG. 11B, the second fixing apparatus 905 is at least a part of an approximate rectangular space capable of surrounding an outer surface of an object meeting a third predetermined condition. Particularly, in the case where the object is the human head, the third predetermined condition is that there are extruded parts the number and location of which correspond to those of the second fixing apparatus 905 (i.e., the human ear and the nose). That is, in the approximate rectangular space surrounding the human head, the second fixing apparatus 905 has support parts corresponding to the extruded parts to be fixed to. For example, it has the temple at the two sides of the space and the nosepiece at the middle of the space to form the approximate rectangular space surrounding the human head.

As shown in FIGS. 12A and 12B, the electronic device 900 may be changed between the first fixed state and the second fixed state, thereby the electronic device 900 may be changed from a usage manner as the smart watch to a usage manner as the smart glass when it requires a long time watch or without the both hands occupied.

Figure 13:
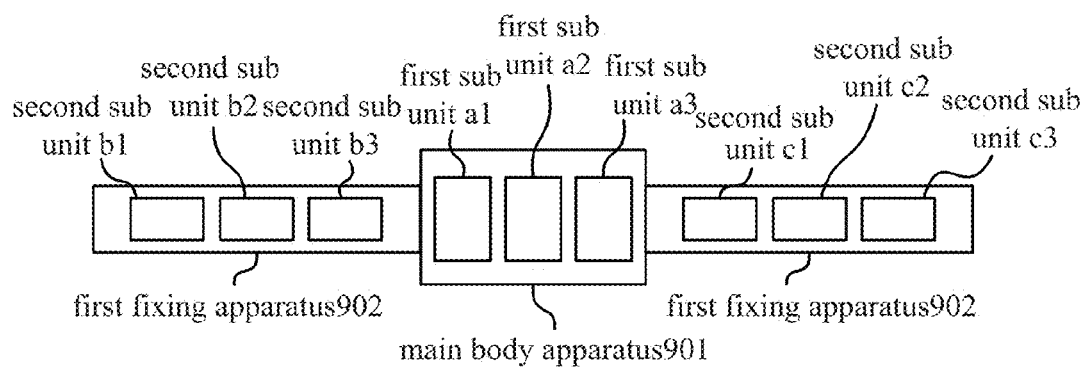
FIG. 13 is a structural diagram showing an electronic device according to an eighth embodiment of the present disclosure.

FIG. 13 is a structural diagram showing the electronic device according to the eighth embodiment of the present disclosure. As shown in FIG. 13, the electronic device according to the eighth embodiment of the present disclosure includes the main body apparatus 901 and the first fixing apparatus 902 as well. Particularly, the main body apparatus 901 includes at least one first sub unit (the first sub units a1-a3), the first fixing apparatus 902 includes at least one second sub unit (the second sub units b1-c3), and the at least one first sub unit and the at least one second sub unit form a data or electrical connection. The multiple first sub units in the main body apparatus 901 may be connected in parallel or serially with each other. Similarly, the multiple second sub units in the first fixing apparatus 902 may be connected in parallel or serially with each other. Also, the at least one sub unit may be connected to the first fixing apparatus 902 via the main body apparatus 901, and then form the data or electrical connection with the at least one second sub unit. Further, the at least one first sub unit may form the data or electrical connection with the at least one second sub unit directly. The first sub unit and the second sub unit may be the display unit, the touch sensitive unit, the sensing unit, the circuit unit, the battery unit, the communication unit, the location unit or the image acquiring unit and so on. The at least one second sub unit is connected to the first fixing apparatus 902 through a dismountable connection interface. Particularly, the multiple second sub units may be mounted inside of the cavity of the first fixing apparatus 902 via a single interface. Alternatively, the multiple second sub units may be mounted inside of the cavity of the first fixing apparatus 902 via multiple interfaces with a one-to-one correspondence. Also, the second sub unit may be mounted and fixed to the outer surface of the first fixing apparatus 902 through an external interface.

Particularly, when the main body apparatus 901 and the first fixing apparatus 902 are discoupled, the functions required by the user currently can be realized through the individual sub units in the main body apparatus 901, so that the power consumption of the electronic device 900 is the lowest and the weight is reduced to the minimum. That is, the first sub unit included in the main body apparatus is capable of supporting work of the electronic device. For example, when the main body apparatus 901 includes the processing unit 903, the first display unit 904 and a necessary battery unit (not shown), the main body apparatus 901 can perform the display function of the electronic device 900. Also, when it is configured with the storage unit or the communication unit, the main body apparatus 901 can perform data storage function and communication function correspondingly, without being coupled with the first fixing apparatus 902.

The one or more of the at least one first sub unit and one or more of the at least one second sub unit may be sub units of different types. In this way, functional configurations adaptively for different usage scenes can be realized by different combinations of the first sub units and the second sub units.

Also, the one or more of the at least one first sub unit and one or more of the at least one second sub unit may be sub units of the same type. Normally, the performance of the first sub unit is lower than that of the second sub unit of the same type. For example, the battery capacity of the first sub unit as a battery unit is lower than that of the second sub unit as the battery unit. The communication distance and communication rate of the first sub unit as a communication unit is lower than those of the second sub unit as the communication unit. More particularly, the sum of the battery capacities of the second sub units as the battery unit in the first fixing apparatus 902 is larger than the battery unit of the first sub unit as the battery unit. Alternatively, the battery capacity of each second sub unit as the battery unit in the first fixing apparatus 902 is larger than the battery capacity of the first sub unit as the battery unit. In this way, the user may configure the individual sub units required to be mounted freely according to the actual requirement. For example, when the user is in a case in which long endurance is required such as travelling, the second sub unit with a higher battery capacity may be configured in the first fixing apparatus 902. When the user is in a case in which light weight is required such as sporting, the unnecessary second sub unit in the first fixing apparatus 902 may be removed, and the power is supplied only by the first sub unit as the battery unit in the main body apparatus 901. Also, when the main body apparatus 901 is configured with a first sub unit having the near distance communication capability, the electronic device 900 may establish a data connection based on for example Bluetooth with another independent electronic device such as a smart phone, so as to extend the function of the independent electronic device, for example, extend the display (in the navigation scenario, displaying the navigation prompt information) or extend the prompt function (in the incoming call scenario, displaying the identification information of the incoming call). When the first fixing apparatus 902 is configured with a second sub unit having a long distance communication capability (for example, the mobile communication network data communication capability or the WLAN data communication capability), the work of the above first sub unit (the near distance communication capable unit) may be paused. The electronic device 900 may become an independent electronic device substituting for example the smart phone, especially for the second sub unit having a mobile communication network (3G, 4G and so on) data communication capability. Of course, if the coverage of the WLAN is wide enough, the same effect can be achieved. That is, the user may configure sub units with different communication capabilities properly according to the usage scene and the requirement. For example, in a case where it is convenient for the user to carry the smart phone, the near distance communication unit in the main body apparatus 901 may be used alone, so that the electronic device 900 in the embodiment of the present disclosure may be used as an attachment of the smart phone. In a case where it is not convenient for the user to carry the smart phone, for example, in a sport, the long distance communication unit may be used, with the electronic device 900 in the embodiment of the present disclosure as a device having an independent communication function.

Also, the first sub unit and the second sub unit in the main body apparatus 901 and the first fixing apparatus 902 may be configured taking the gravity center distribution of the electronic device itself into consideration, so that the weight of the electronic device is distributed evenly to provide a more comfortable wearing experience. Particularly, the cavity or the external interface for mounting the first sub unit and the second sub unit in the main body apparatus 901 and the first fixing apparatus 902 may be distributed symmetrically. For example, in the electronic device 900 in the state of for example the smart watch or the smart glass, the first fixing apparatus 902 arranged at the two sides of the main body apparatus 901 has the same number of the cavity or the external interface. Also, the sub unit mounted to the cavity or the external interface may be configured with the uniform specification. For example, they have the same size, and have almost the same weight (the difference between the weights of the individual sub units may be designed to be smaller than a predetermined weight threshold, such as 20 gram).

Figure 14:
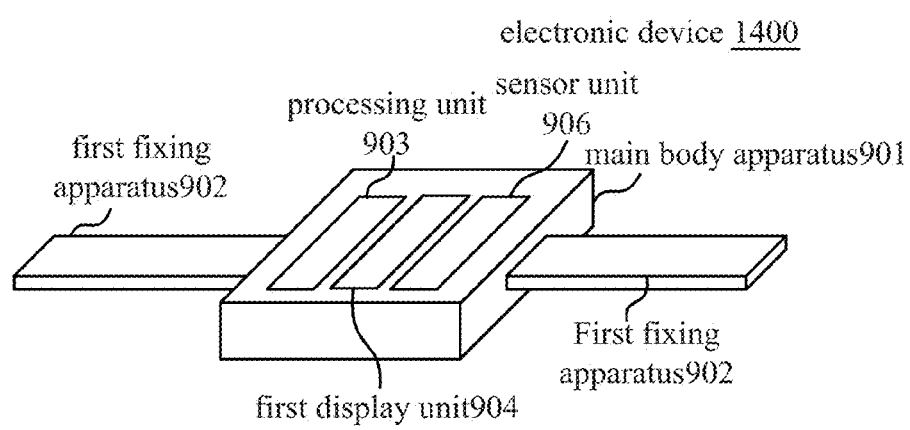
FIG. 14 is a structural diagram showing an electronic device according to a ninth embodiment of the present disclosure.

FIG. 14 is a structural diagram of the electronic device according to the ninth embodiment of the present disclosure. Compared to the electronic device 900 according to the sixth embodiment of the present disclosure described with reference to FIG. 9A, the electronic device 1400 according to the ninth embodiment of the present disclosure shown in FIG. 14 further includes a sensor unit 906. As shown in FIG. 14, the sensor unit 906 is arranged on the main body apparatus 901. However, the sensor unit 906 is arranged on the first fixing apparatus 902 as well.

The sensor unit 906 is used to generate a first control signal when sensing the first predetermined condition is met, and the processing unit 903 controls the on/off of the first display unit 904 according to the first control signal. In an embodiment of the present disclosure, the sensor unit 906 is an acceleration sensor, the acceleration component value in the gravity direction of the first control signal is larger than or equal to a predetermined value (i.e., the user pulls down the electronic device 1400 from the using state in which the first display unit 904 is being watched), and the processing unit 903 controls the on/off of the first display unit 904 according to the first control signal.

It is easily to be understood by those skilled in the art that the sensor unit according to the embodiment of the present disclosure is not limited to the acceleration sensor, and can include other sensor unit capable of generating the control signal. Also, in another embodiment of the present disclosure, the sensor unit 906 may be a GPS location unit, and the map as well as the corresponding navigation information may be displayed by the first display unit 904 based on the location of the GPS location unit. Also, in another embodiment of the present disclosure, the sensor unit 906 may be a sensing device such as a gyro, and the reference direction of the sensor unit 906 is correlated with the viewable direction of the first display unit 904. Thereby, the display of the first display unit 904 may be adjusted according to the movement of the electronic device 1400 sensed by the sensor unit 906. Particularly, when the structure of the main body apparatus 901 (the dial section) of the electronic device 1400 (such as the smart watch) is not a shape change structure, since the main body apparatus 901 (the dial section) being watched at this time is vertical to the horizontal plane, the gravity direction set in the sensor unit 906 is the direction pointing to 12 o'clock of the center in the dial section. When the shape of the main body apparatus 901 (the dial section) of the electronic device 1400 (such as the smart watch) is changeable, since the main body apparatus 901 (the dial section) being watched at this time is horizontally placed, the gravity direction set in the sensor unit 906 is vertically up to the dial surface.

Figure 15A:
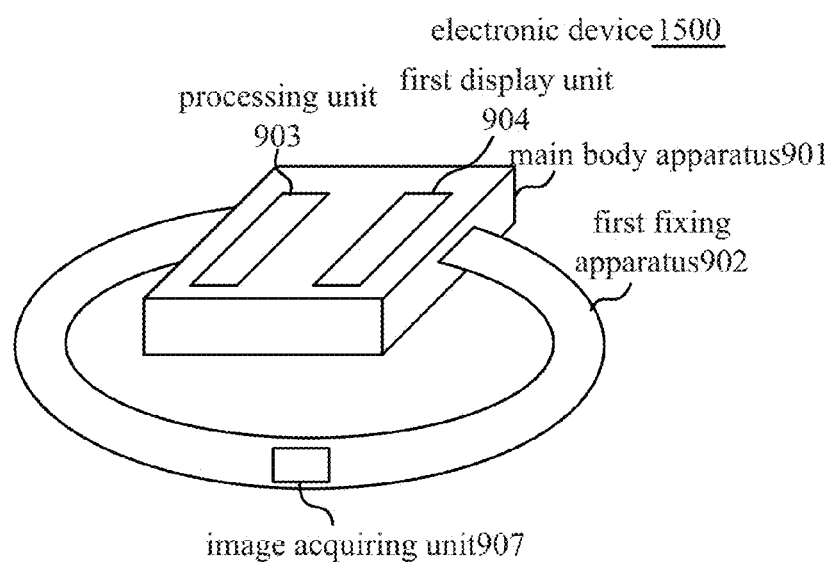
FIGS. 15A and 15B are structural diagrams showing an electronic device according to a tenth embodiment of the present disclosure.
Figure 15B:
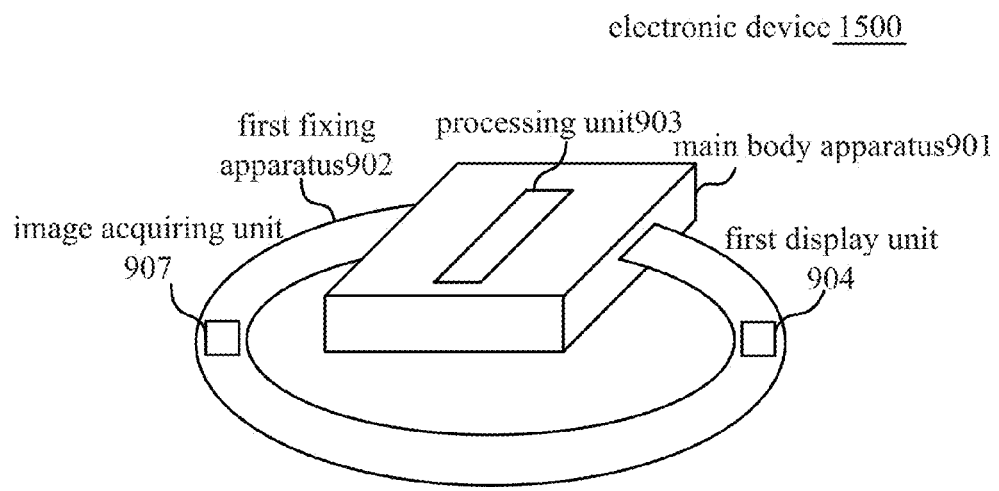

FIGS. 15A and 15B are structural diagrams showing the electronic device according to the tenth embodiment of the present disclosure. Compared to the electronic device 900 according to the sixth embodiment of the present disclosure described with reference to FIG. 9A, the electronic device 1500 according to the tenth embodiment of the present disclosure shown in FIGS. 15A and 15B further includes an image capturing unit 907. The image capturing unit 907 may be arranged on the main body apparatus 901 or the first fixing apparatus 902. Particularly, FIG. 15A shows the case in which the first display unit 904 is arranged on the main body apparatus 901 and the image capturing unit 907 is arranged on the first fixing apparatus 902. FIG. 15B shows the case in which the first display unit 904 and the image capturing unit 907 are both arranged on the first fixing apparatus 902. No matter the case in FIG. 15A or FIG. 15B, the image capturing direction of the image capturing unit 907 is opposite to an image output direction of the first display unit 904 in the radial direction of the annular space or the approximate annular space. In this way, when the real scene image captured by the image capturing unit 907 is displayed on the first display unit 904, since the capturing direction of the image capturing unit 907 is consistent with the watching direction of the user eye, the user may see an image as if it perspective through the electronic device 1500 through the first display unit 904.

In an embodiment of the present disclosure, the image capturing unit 907 is used to capture an interaction action of the user to generate a first image capturing signal, the processing unit 903 converts the first image capturing signal into a second control signal to control the display of the second image by the first display unit 904.

In another embodiment of the present disclosure, the image capturing unit 907 is used to capture a first sub image in the image capturing direction, the processing unit 903 generates a second sub image which may be an identification image about the first sub image acquired by analyzing the first sub image, or may also be an identification image acquired based on the sensor such as the GPS sensor. Also, the second sub image may also be an identification image acquired from a server through network based on feature information acquired from the first sub image. The first sub image is superimposed with the second sub image to generate the first image for displaying by the first display unit 904.

Figure 16:
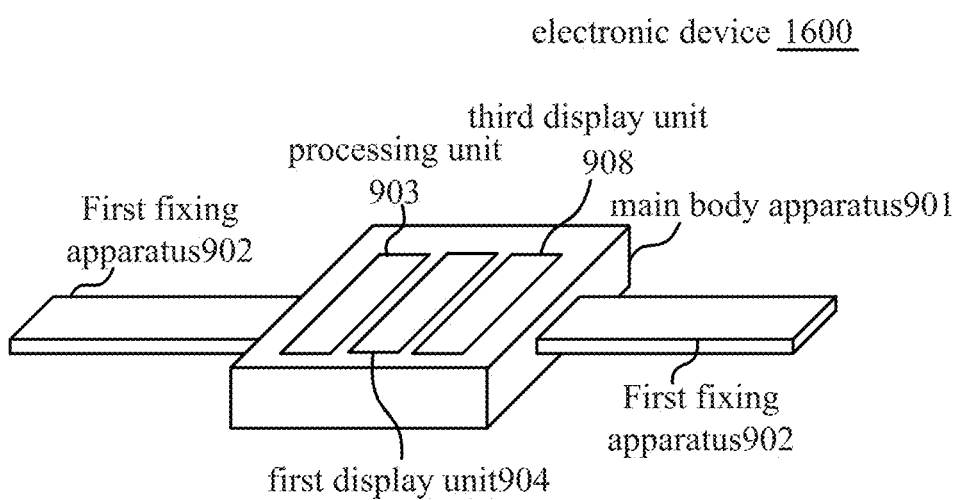
FIG. 16 is a structural diagram showing an electronic device according to an eleventh embodiment of the present disclosure.

FIG. 16 is a structural diagram of the electronic device according to the eleventh embodiment of the present disclosure. Compared to the electronic device 900 according to the sixth embodiment of the present disclosure described with reference to FIG. 9A, the electronic device 1600 according to the eleventh embodiment of the present disclosure shown in FIG. 16 further includes a third display unit 108. In the electronic device 1600 shown in FIG. 16, the third display unit 908 is arranged on the main body apparatus 901 together with the first display unit 904. It will be easily understood that the present disclosure is not limited thereto. The third display unit 908 may be arranged on the first fixing apparatus 902 together with the first display unit 904.

The third display unit 908 is a display unit with the same type as that of the first display unit 904. That is, the third display unit includes a second display component (not shown) for displaying the third image, and a second optical component (not shown) for receiving light corresponding to the third image emitted from the second display component and changing the light path of the light corresponding to the third image to form a magnified virtual image corresponding to the third image. The third image is related to the first image. When both eyes of the viewer watches the first display unit 904 and the third display unit 908 respectively, the viewer is enabled to be aware of a 3D image corresponding to the first image and the third image.

In the following, different configuration examples of the first viewable part and the section viewable part will be described with reference to FIG. 17A to FIG. 19B.

Figure 17A:
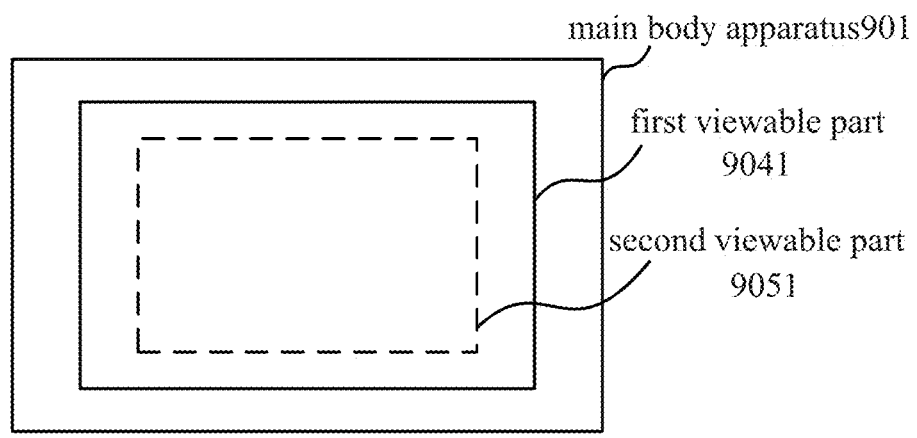
FIGS. 17A and 17B are a vertical view and a side view of a first configuration example of a viewable part of an electronic device according to an embodiment of the present disclosure, respectively.
Figure 17B:
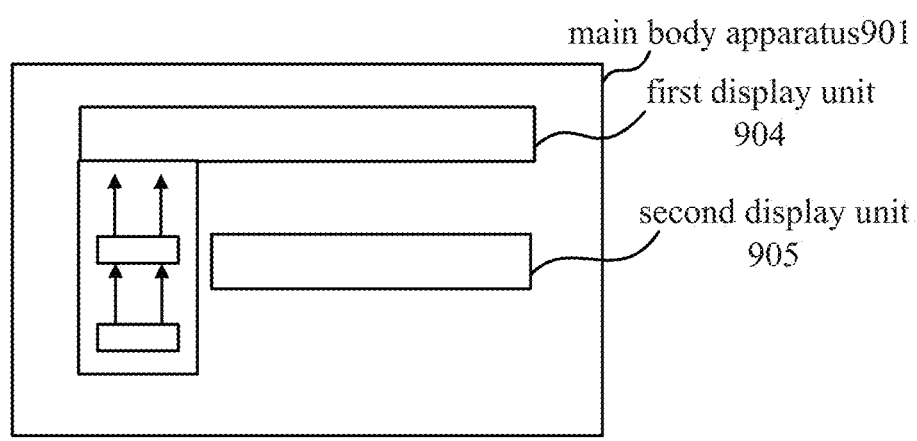

FIGS. 17A and 17B are the vertical view and the side view of the first configuration example of the viewable part of the electronic device according to the embodiment of the present disclosure, respectively.

As shown in FIG. 17A, the first viewable part 9041 and the second viewable part 9051 has the first configuration example of being arranged on the main body apparatus 901 overlapped with each other. The present disclosure is not limited thereto, and the first viewable part 9041 and the second viewable part 9051 may also be arranged on the first fixing apparatus 902 overlapped with each other.

FIG. 17B further shows the vertical view of the first configuration example of the first viewable part 9041 and the second viewable part 9051 being overlapped. As shown in FIG. 17B, the first display unit 904 arranged with the first viewable part 9041 and the second display unit 905 arranged with the second display unit 905 are configured as shown in FIG. 17B, so that at least the first viewable part 9041 and the second viewable part 9051 are at the viewable part of the outer side of the annular space or the approximate annular space. The transmittance of the annular space or the approximate annular space in the direction outwards meets a predetermined condition which may be that the transmittance is larger than or equal to a predetermined value (such as 70%). In the example shown in FIGS. 17A and 17B, the first viewable part 9041 is arranged at the outer side. The present disclosure is not limited thereto, and the second viewable part 9051 may be arranged at the outer side. By making the transmittance of the first viewable part 9041 larger than or equal to the predetermined value, the display function of the second viewable part 9051 is not affected by the first viewable part 9041, and a more compact configuration may be realized.

Figure 18A:
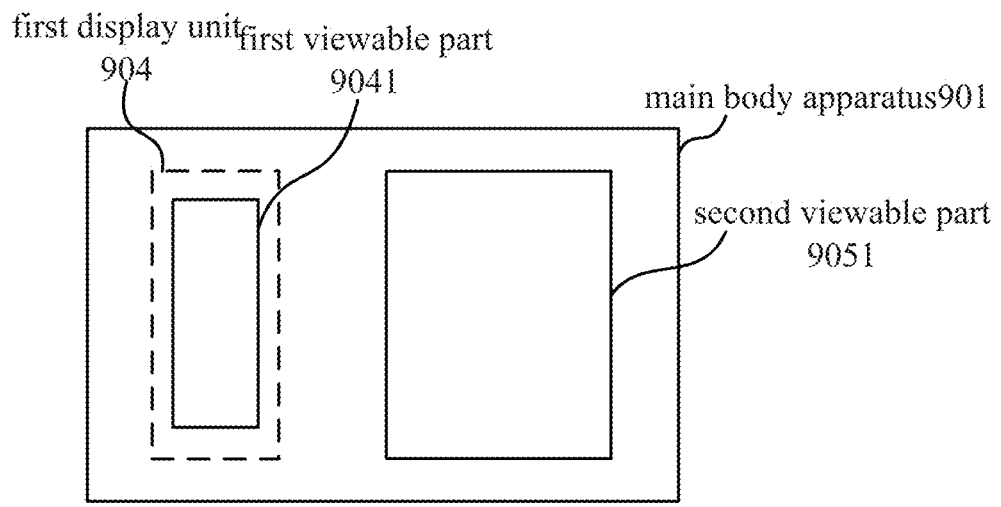
FIGS. 18A and 18B are a vertical view and a side view of a second configuration example of a viewable part of an electronic device according to an embodiment of the present disclosure, respectively.
Figure 18B:
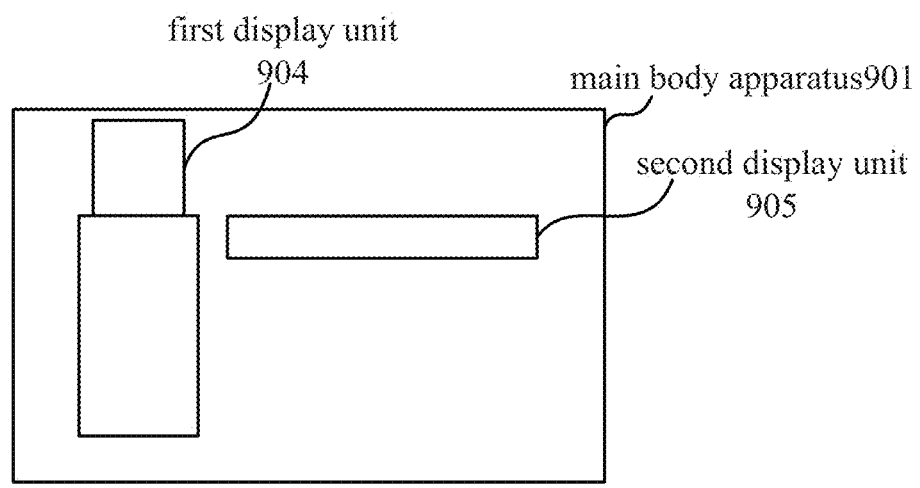

FIGS. 18A and 18B are the vertical view and the side view of the second configuration example of the viewable part of the electronic device according to the embodiment of the present disclosure, respectively.

As shown in FIG. 18A, the first viewable part 9041 and the second viewable part 9051 has the second configuration example of being arranged on the main body apparatus 901 or the first fixing apparatus 902 adjacently with each other. In FIGS. 18A and 18B, the first viewable part 9041 and the second viewable part 9051 are arranged adjacently in the main body apparatus 901. The present disclosure is not limited thereto, and the first viewable part 9041 and the second viewable part 9051 may be arranged on the main body apparatus 901 and the first fixing apparatus 902 respectively, and the distance between the first viewable part 9041 and the second viewable part 9051 is smaller than a threshold such as 1 cm.

FIG. 18B further shows the vertical view of the second configuration example of the first viewable part 9041 and the second viewable part 9051 adjacently with each other. As shown in FIG. 18B, the first display unit 904 arranged with the first viewable part 9041 and the second display unit 905 arranged with the second display unit 905 are configured adjacently as shown in FIG. 18B, and the display directions of the first viewable part 9041 and the second viewable part 9051 are at the outwards direction of the annular space or the approximate annular space.

Figure 19A:
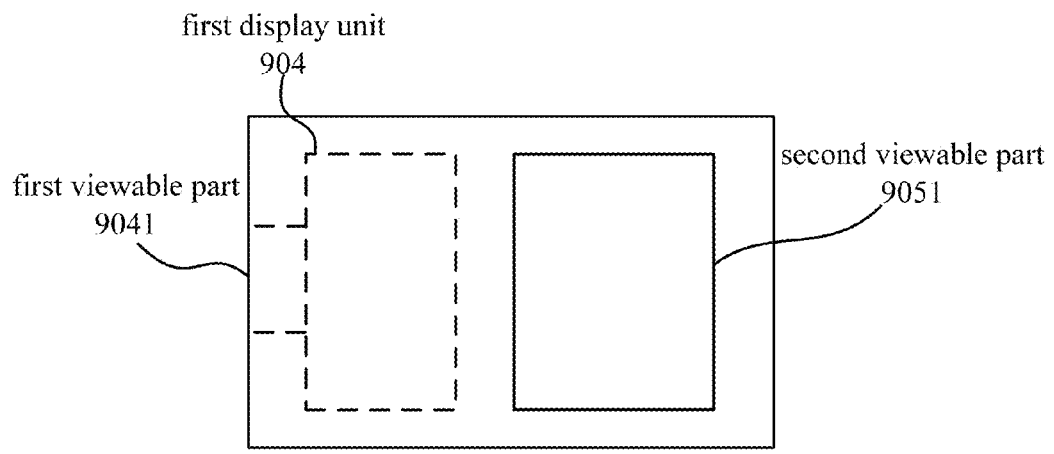
FIGS. 19A and 19B are a vertical view and a side view of a third configuration example of a viewable part of an electronic device according to an embodiment of the present disclosure, respectively.
Figure 19B:
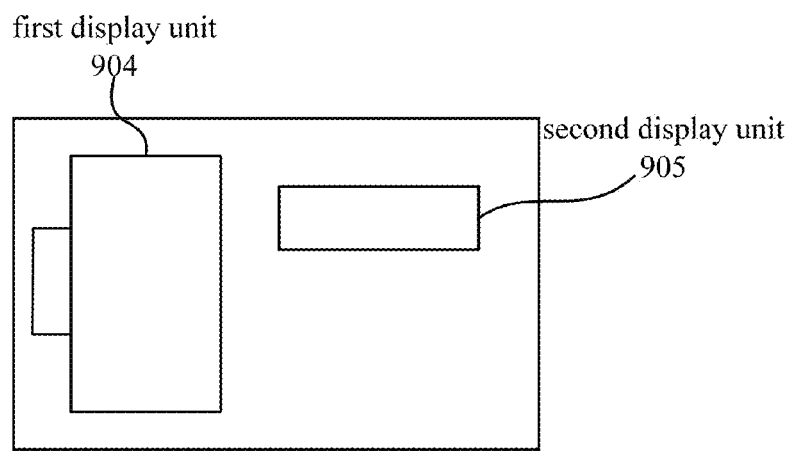

FIGS. 19A and 19B are the vertical view and the side view of the first configuration example of the viewable part of the electronic device according to the embodiment of the present disclosure, respectively.

As shown in FIG. 19A, the first viewable part 9041 and the second viewable part 9051 has the third configuration example of being arranged on the main body apparatus 901 adjacently with each other. Different from the second configuration example shown in FIGS. 18A and 18B, as shown in FIG. 19B, the display direction of one of the first viewable part 9041 and the second viewable part 9051 is the outwards direction of the annular space or the approximate annular space, and the display direction of the other one of the first viewable part 9041 and the second viewable part 9051 is in the direction vertically to the outwards direction of the annular space or the approximate annular space.

Further, the switching between the overlapped state and the non-overlapped state of the first viewable part 9041 and the second viewable part 9051 will be described with reference to FIGS. 20A and 20B.

Figure 20A:
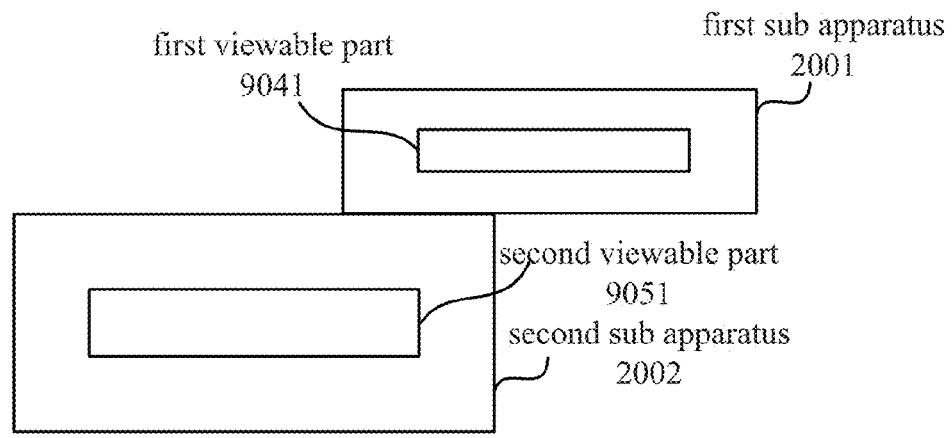
FIGS. 20A-20D are schematic diagrams showing a first to a third example of a relative moving state of the viewable part of the electronic device according to an embodiment of the present disclosure.
Figure 20B:
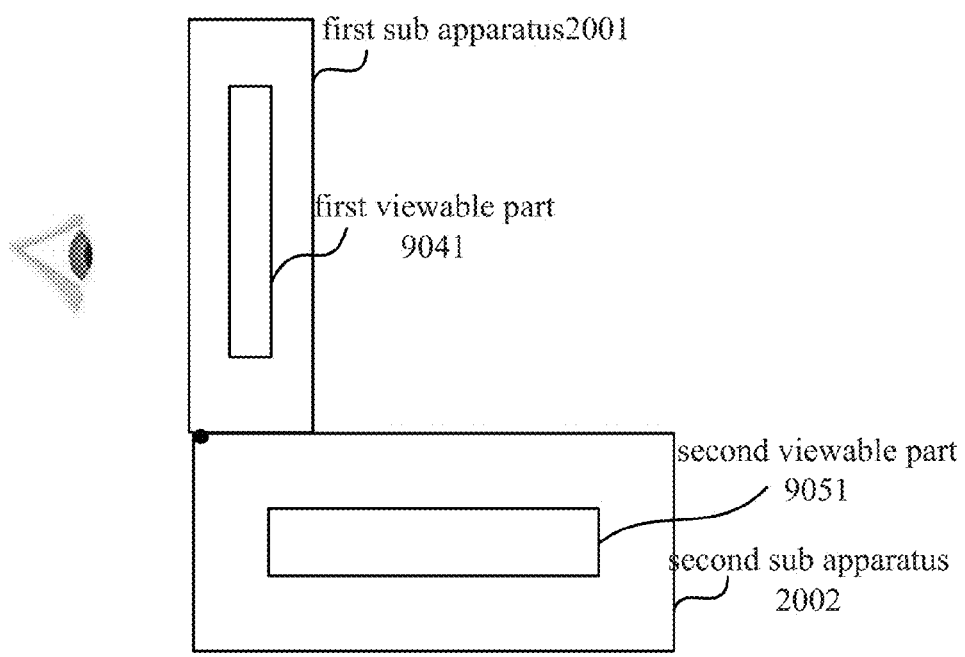

FIGS. 20A and 20B are schematic diagrams of the first to fourth examples of the moving state of the viewable part of the electronic device according to the embodiment of the present disclosure. For the convenience of description, the case in which the first viewable part 9041 and the second viewable part 9051 are both arranged at the main body apparatus 901 is taken as an example. It is easily to be understood by those skilled in the art that the present disclosure is not limited thereto, and the first viewable part 9041 and the second viewable part 9051 may be both arranged in the first fixing apparatus 902. The main body apparatus 901 further includes a first sub apparatus 2001 and a second sub apparatus 2002. One of the first viewable part 9041 and the second viewable part 9051 is arranged on the first sub apparatus 2001, and the other one is arranged on the second sub apparatus 2002. The first sub apparatus 2001 and the second sub apparatus 2002 are connected via the connection unit, so that the first viewable part 9041 and the second viewable part 9051 are switched between the first state and a third state of not being overlapped arranged.

Particularly, as shown in FIG. 20A, the first sub apparatus 2001 and the second sub apparatus 2002 are connected via a slide way component (not shown) as the connection unit. The first viewable part 9041 is arranged in the first sub apparatus 2001, and the second viewable part 9051 is arranged in the second sub apparatus 2002. When the first sub apparatus 2001 and the second sub apparatus 2002 slide away from each other, the first viewable part 9041 and the second viewable part 9051 may display at the same time or may display independently. Also, it may be set that the sliding of the first sub apparatus 2001 with respect to the second sub apparatus 2002 generates the control signal controlling the display or powering off of the second viewable part 9051. Also, when the first sub apparatus 2001 slides to a third state with respect to the second sub apparatus 2002, the transmittance of the first viewable part 9041 in the outwards direction of the annular space or the approximate annular space meets a predetermined condition. In this way, the user may observe his/her skin through the electronic device 900, as if no first viewable part 9041 is arranged.

Figure 20C:
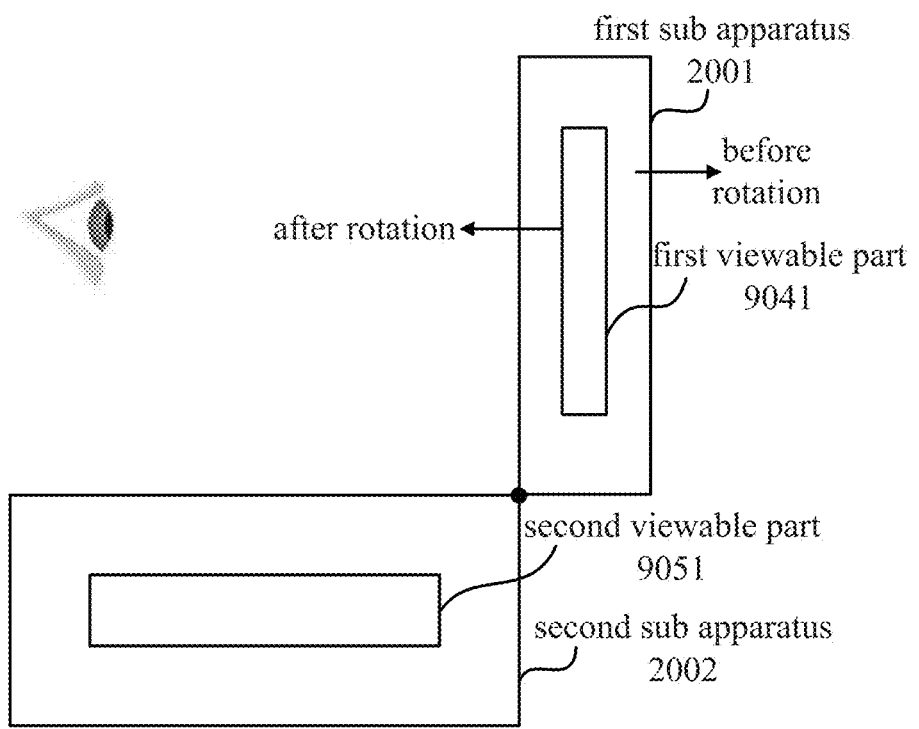
Figure 20D:
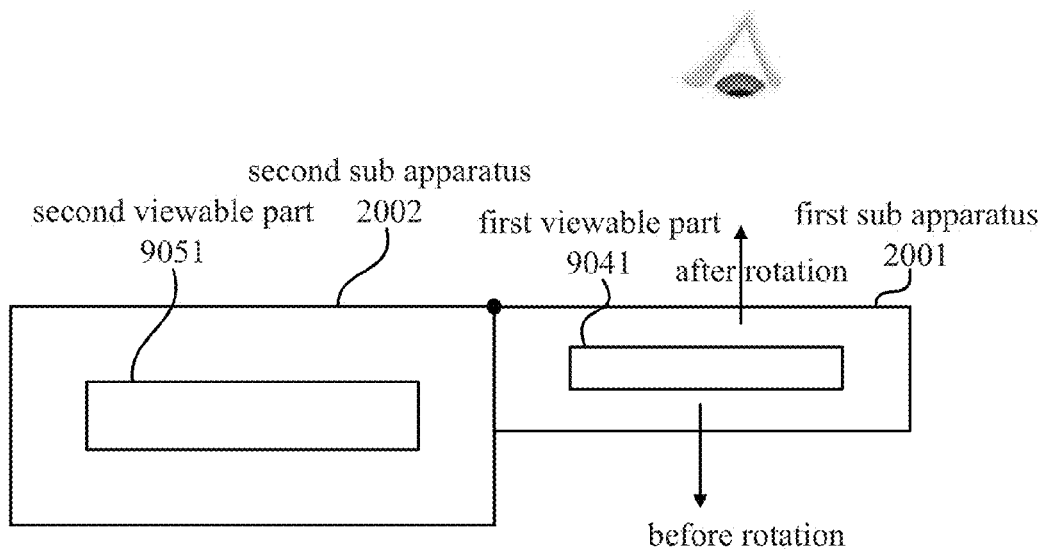

As shown in FIGS. 20B-20D, the first sub apparatus 2001 and the second sub apparatus 2002 are connected via a pivot component as the connection unit. The first viewable part 9041 is arranged in the first sub apparatus 2001, and the second viewable part 9051 is arranged in the second sub apparatus 2002. When the first sub apparatus 2001 is rotated with respect to the second sub apparatus 2002, the first viewable part 9041 and the second viewable part 9051 may display at the same time or display independently. Also, it may be set that the rotating of the first sub apparatus 2001 with respect to the second sub apparatus 2002 generates the control signal controlling the display or powering off of the second viewable part 9051.

It is to be noted that as shown in FIGS. 20A and 20B, when the first sub apparatus 2001 slides or rotates to switch from the first state to the third state, the display direction of the first viewable part 9041 does not change, and the user may continue to see the display of the first viewable part 9041 in the original display direction.

However, as shown in FIGS. 20C and 20D, when the first sub apparatus 2001 rotates to switch from the first state to the third state, the first sub apparatus 2001 needs to be further configured, so that the user may see the display of the first viewable part 9041 in the same direction in both the first state and the third state, thereby further improving the convenience of the user. Therefore, in an embodiment of the present disclosure, the first sub apparatus 2001 may be configured to rotate itself, i.e., rotate 180 degrees when the first sub apparatus 2001 rotates with respect to the second sub apparatus 2002, so that the first viewable part 9041 turned over to the back side turns back to the original display direction again. That is, the display direction of the first viewable part 9041 remains unchanged after rotating.

Also, in another embodiment of the present disclosure, the first display unit 104 may be configured to be capable of performing bidirectional display by a light path selection unit or an optical switching unit. Particularly, in the light path of the first display unit 104 shown in FIGS. 3A-3C, a beam splitting device is arranged, so that the light beam for forming the magnified virtual image is guided to two display direction arranged opposite to each other in the first display unit 104 respectively. Also, a light path switching device such as a mirror may be arranged in the light path of the first display unit 104 shown in FIGS. 3A-3C, so that the light path switching device is rotated when necessary to guide the light beam for forming the magnified virtual image to two display direction arranged opposite to each other in the first display unit 104. That is, when the first sub apparatus 2001 is rotated with respect to the second sub apparatus 2002, the display direction of the first viewable part 9041 of the first display unit 104 switches bidirectionally by the above beam splitting device or the light path switching device in response to the rotation, so that the display direction of the first viewable part 9041 remains unchanged to the user after the rotation.

The electronic device according to the second implementation of the present disclosure has been described above with reference to FIGS. 9-20. In the following, the display method used by the electronic device will be described with reference to FIG. 21.

Figure 21:
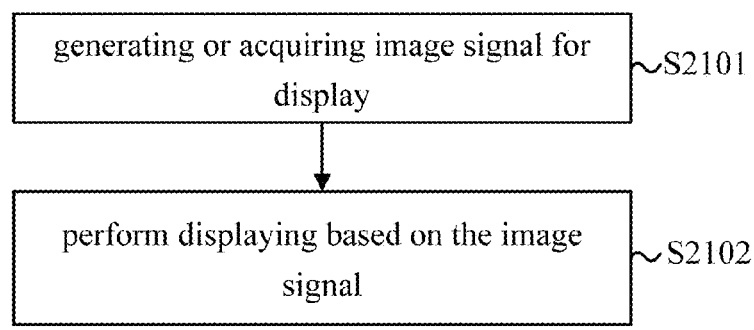
FIG. 21 is a flowchart showing a display method according to a second implementation of the present disclosure.

FIG. 21 is a flowchart showing the display method according to the present disclosure. The display method shown in FIG. 21 is applied to the electronic device shown in FIG. 9. As described above, the electronic device includes a main body apparatus having a processing unit which generates a first image and performs display control; a fixing apparatus connected with the main body apparatus, having at least a fixed state in which the fixing apparatus can be at least a part of an annular space or an approximate annular space meeting a first predetermined condition, the annular space or the approximate annular space being capable of surrounding an outer side of a cylinder meeting a second predetermined condition; and a first display unit arranged on the main body apparatus or the fixing apparatus, which outputs the first image, wherein the first display unit comprises a first display component which displays the first image, and a first optical component which receives light corresponding to the first image emitted from the first display component, and changes the light path of the light corresponding to the first image to form a magnified virtual image corresponding to the first image.

The display method includes: generating or acquiring an image signal for display (step S2101); and performing display based on the image signal (step S2102).

In the step S2101, the processing unit 903 of the electronic device 900 may generate an image signal for display. Also, the electronic device 900 may acquire the image signal for display from the server or another electronic device by the communication unit. Then, the processing goes to step S2102.

In the step S2102, the display unit of the electronic device 900 performs display based on the image signal generated or displayed in the step S2101. Particularly, as described above, the display may include displaying a magnified virtual image corresponding to the image signal by the display unit including the display component and the optical component. Also, the display further includes generating a display control signal based on the signal acquired by the sensor to control the on/off of the display of the image signal, and so on. Further, the display may include displaying a magnified 3D virtual image corresponding to the image signal by two display units including the display component and the optical component.

The electronic device and display method according to the embodiment of the present disclosure have been described above with reference to FIGS. 1-21. The electronic device and the display method according to the embodiments of the present disclosure are not limited by the size of the wearable electronic device such as the smart watch itself, and the image or video display with a larger size and a higher definition is provided. Also, the power consumption of the electronic device is relatively low compared to the micro projector for displaying a large image, the electronic device is not limited by the usage scene and well usage privacy is provided.

Also, the electronic device and the display method according to the embodiments of the present disclosure can provide multiple wearing manners adaptively according to different usage scenes and user requirements, and provide a free combination and switching between multiple functional modules, thereby improving user experience of the electronic device.

It is to be noted that in the present description, the term of "comprising", "including" or the like does not intend to cover an inclusion exclusively, and a process, a method, an article or a device comprising a series of elements does not only include those elements, but also include other elements not listed explicitly, or include elements that art intrinsic to the process, the method, the article or the device. Without other limitations, the element defined by the term "comprising a" does not exclude to include other same element in the process, the method, the article or the device comprising the element.

Finally, it is to be noted that the above series of process does not include the process performed in a time order as described herein, but also include processes performed in parallel or separately, instead of in the time order.

With the description of the implementations above, those skilled in the art may understand that the technology in the embodiments of the present disclosure may be realized by software in combination with necessary general hardware platform, or entirely by hardware. Based on such understanding, the technical solution, or at least the part which contribute to the prior art, in the embodiment of the present disclosure, in essence, may be realized by software product, which may be stored in a storage medium such as a ROM/RAM, a magnetic diskette, an optical disk, etc., and include several instructions which may cause a computer device, such as a PC, a server or a network device etc., to perform the method according to the embodiments, or at least certain parts of the embodiments of the present disclosure.

The implementations of the present disclosure have been described above in detail. The principle and the implementations of the present disclosure are described by way of example. The description of the above embodiments is only to help the understanding of the method and the core of the present disclosure. To those skilled in the art, alternations may occur in terms of the implementation or the application range based on the idea of the present disclosure. In summary, the content of the specification does not be construed to limit the present disclosure thereto.

The invention claimed is:

1. An electronic device, comprising:
   a main body apparatus comprising a processing unit which generates a first image and performs display control;
   a first fixing apparatus connected with the main body apparatus, which maintains a relative location relationship between the electronic device and at least a part of body of a user when the user wears the electronic device;
   a first display unit arranged on the main body apparatus and/or the first fixing apparatus, which outputs the first image; and
   a sensor unit arranged on the main body apparatus or the first fixing apparatus, which generates a first control signal when sensing that a first predetermined condition is met, the processing unit controlling an on/off of the first display unit according to the first control signal;

wherein the first display unit comprises a first display component which displays the first image, and a first optical component which receives light corresponding to the first image emitted from the first display component, and changes the light path of the light corresponding to the first image to form a magnified virtual image corresponding to the first image.

2. The electronic device according to claim 1, wherein the first fixing apparatus has at least a first fixed state in which the first fixing apparatus can be at least a part of an annular space or an approximate annular space meeting a first predetermined condition, the annular space or the approximate annular space being capable of surrounding an outer side of a cylinder meeting a second predetermined condition.

3. The electronic device according to claim 2, wherein at least a part of the first optical component is a component the transmittance of which meets a predetermined condition in an outward direction of the annular space or the approximate annular space.

4. The electronic device according to claim 3, wherein the transmittance of the electronic device meets the predetermined condition in the outward direction of the annular space or the approximate annular space corresponding to at least a part of the first optical component.

5. The electronic device according to claim 2, further comprising a second display unit the type of which is different from that of the first display unit, wherein one of the first display unit and the second display unit is arranged on the main body apparatus, the other of which is arranged on the first fixing apparatus, and the display direction of the second display unit is the outward direction of the annular space or the approximate annular space.

6. The electronic device according to claim 5, wherein the first display unit is arranged on the main body apparatus, and the second display unit is arranged on the first fixing apparatus; or the second display unit is arranged on the main body apparatus and the first display unit is arranged on the first fixing apparatus.

7. The electronic device according to claim 5, further comprising a third display unit arranged on the main body apparatus or the first fixing apparatus together with the first display unit, which outputs a third image, wherein the third display unit comprises a second display component configured to display the third image, and a second optical component configured to receive light corresponding to the third image emitted from the second display component and changing the light path of the light corresponding to the third image to form a magnified virtual image corresponding to the third image.

8. The electronic device according to claim 2, further comprising an image capturing unit arranged on the main body apparatus or the first fixing apparatus, and an image capturing direction of the image capturing unit is opposite to an image output direction of the first display unit in a radial direction of the annular space or the approximate annular space.

9. The electronic device according to claim 8, wherein the image capturing unit captures an interaction action of the user to generate a first image capturing signal, the processing unit converts the first image capturing signal into a second control signal to control the display of a second image.

10. The electronic device according to claim 8, wherein the image capturing unit captures a first sub image in the image capturing direction, and the processing unit generates a second sub image and superimposes the first sub image with the second sub image to generate the first image.

11. The electronic device according to claim 2, wherein diameter of the annular space or the approximate annular space is variable, and the difference between the maximum and the minimum of the diameter is larger than a predetermined threshold.

12. The electronic device according to claim 11, wherein the first fixing apparatus comprises at least a flexible unit having a relaxed first state in which the diameter of the annular space or the approximate annular space is the maximum, and a tight second state in which the diameter of the annular space or the approximate annular space is the minimum.

13. The electronic device according to claim 11, wherein the first fixing apparatus further comprises an adjusting unit which controls the diameter of the annular space or the approximate annular space to change between the maximum and the minimum.

14. The electronic device according to claim 2, wherein the main body apparatus comprises a first connecting unit, the first fixing apparatus comprises a second connecting unit, and the main body apparatus and the first fixing apparatus are connected with each other through the coupling between the first connecting unit and the second connecting unit;

the electronic device further comprises a second fixing apparatus having at least a second fixed state in which the second fixing apparatus is at least a part of an approximate rectangular space capable of surrounding an outer surface of an object meeting a third predetermined condition, the first fixing apparatus comprises a third connecting unit, and the electronic device is switched from the first fixed state to the second fixed state when the first connecting unit and the second connecting unit are discoupled and the first connecting unit and the third connecting unit are coupled.

15. The electronic device according to claim 1, wherein the sensor unit is an acceleration sensor, the acceleration component value in the gravity direction of the first control signal is larger than or equal to a predetermined value, and the processing unit controls the on/off of the first display unit according to the first control signal.

16. The electronic device according to claim 1, wherein the main body apparatus comprises at least one first sub unit, the first fixing apparatus comprises at least one second sub unit, and the at least one first sub unit and the at least one second sub unit form a data or electrical connection.

17. The electronic device according to claim 16, wherein the at least one second sub unit is connected to the first fixing apparatus through a dismountable connection interface.

18. The electronic device according to claim 16, wherein one or more of the at least one first sub unit and one or more of the at least one second sub unit are sub units with the same type and different performance parameters.

* * * * *